US012311809B2

(12) United States Patent
Gay et al.

(10) Patent No.: US 12,311,809 B2
(45) Date of Patent: May 27, 2025

(54) CHILD SAFETY SEAT

(71) Applicant: Kioma, Inc., Dallas, TX (US)

(72) Inventors: Christopher Edward Gay, Dallas, TX (US); Christopher William Wischkowsky, Irving, TX (US)

(73) Assignee: Kioma, Inc., Dallas, TX (US)

( * ) Notice: Subject to any disclaimer, the term of this patent is extended or adjusted under 35 U.S.C. 154(b) by 207 days.

(21) Appl. No.: 18/138,509

(22) Filed: Apr. 24, 2023

(65) Prior Publication Data

US 2023/0339371 A1 Oct. 26, 2023

Related U.S. Application Data

(60) Provisional application No. 63/334,658, filed on Apr. 25, 2022.

(51) Int. Cl.
*B60N 2/28* (2006.01)
(52) U.S. Cl.
CPC .................. *B60N 2/2821* (2013.01)
(58) Field of Classification Search
None
See application file for complete search history.

(56) References Cited

U.S. PATENT DOCUMENTS

| | | | | |
|---|---|---|---|---|
| 5,567,008 | A * | 10/1996 | Cone, II ............... | B60N 2/2821 297/256.16 |
| 2016/0347210 | A1* | 12/2016 | Mason .................. | B60N 2/2821 |
| 2018/0251051 | A1* | 9/2018 | Anderson ............ | B60N 2/2821 |
| 2021/0316642 | A1* | 10/2021 | Ma ....................... | B60N 2/2824 |
| 2024/0227639 | A1* | 7/2024 | Zeng ........................ | B60N 2/28 |
| 2024/0239251 | A1* | 7/2024 | Chen ..................... | B60N 2/2842 |
| 2024/0239396 | A1* | 7/2024 | Saucier ................ | B60N 2/2848 |
| 2024/0246462 | A1* | 7/2024 | Saucier ................... | B62B 7/142 |
| 2024/0270132 | A1* | 8/2024 | Toonders ............. | B60N 2/2821 |

* cited by examiner

*Primary Examiner* — David E Allred
(74) *Attorney, Agent, or Firm* — Gregory M. Howison

(57) ABSTRACT

A child car seat mounting system for mounting a child car seat in a car seat is disclosed having a base unit disposed on the car seat that includes mounting brackets secured to the base unit. The mounting brackets each having a planar configuration perpendicular to the base unit with an upper edge extending from the first surface to the second surface at an obtuse angle and parallel to each other and separated by a separation distance. Mounting slots are provided to receive a mounting member disposed on the underside of the child car seat. Locking levers operate in a release configuration for releasing the mounting member to allow the mounting member to be moved upwards from the mounting slots. A release device configures the locking levers in a release configuration to release the locking lever when it is desired to move the mounting member upwards from the mounting slot.

10 Claims, 32 Drawing Sheets

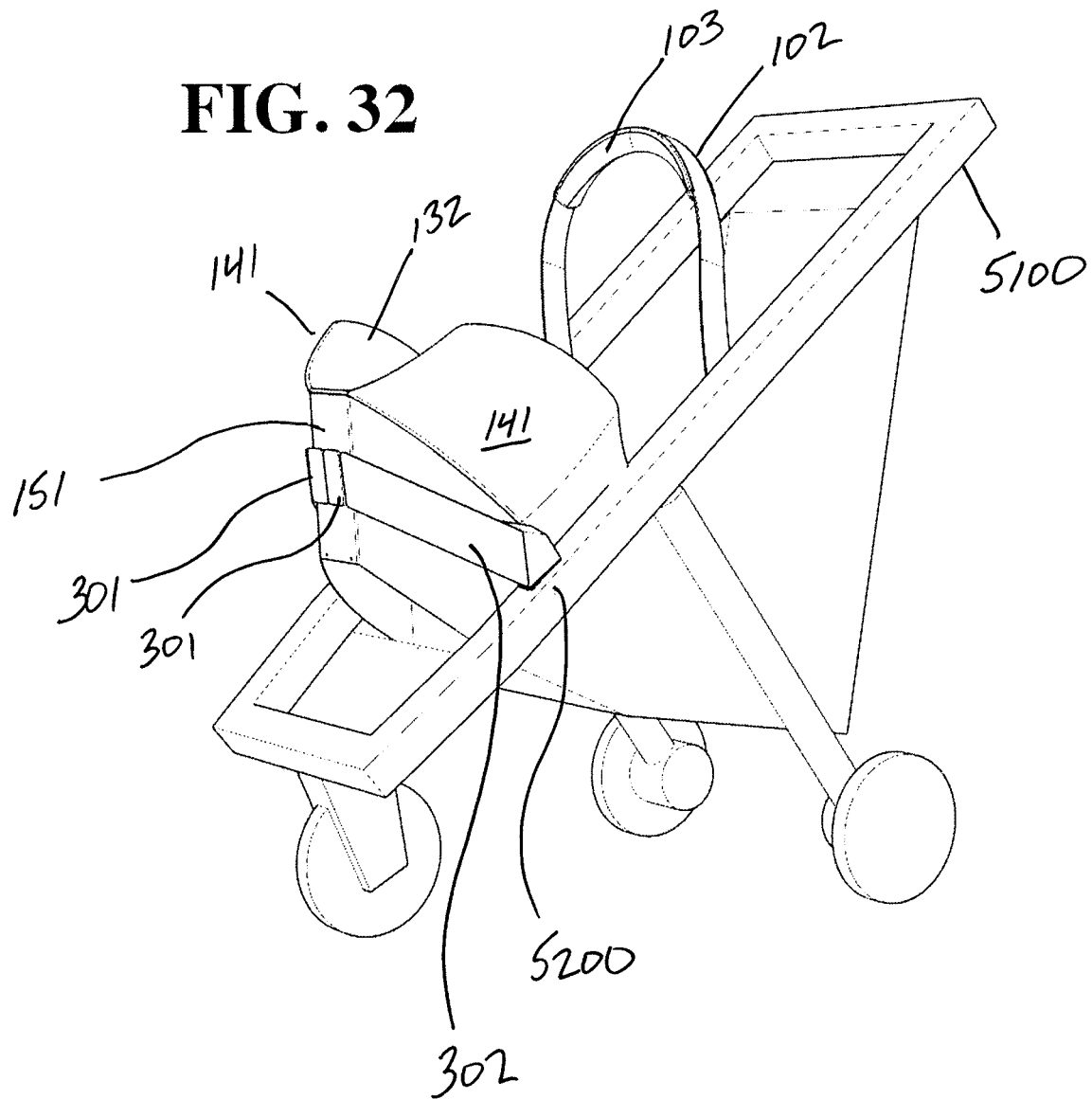

CHILD SAFETY SEAT

CROSS-REFERENCE TO RELATED APPLICATIONS

This application claims the benefit of U.S. Patent Application No. 63/334,658, filed Apr. 25, 2022, entitled CHILD SAFETY SEAT, which is incorporated by reference herein in its entirety.

TECHNICAL FIELD

This disclosure relates to automotive safety in general and child safety seats and strollers in particular.

BACKGROUND

Child safety seats, sometimes called child restraint systems (CRS), are legally required in many countries, including the United States, to more safely transport infants and young children inside vehicles.

Existing child safety seats for use in vehicles are designed for vary narrow laboratory test conditions (typically focused on frontal vehicle collisions), that do not reflect the reality and perils of modern family usage both in a vehicle and out of a vehicle.

Many children spend more time in a child safety seat outside of a vehicle, than in a vehicle. This is why a common cause of injury is slips, spills, and falls by the caregiver. For example, if a caregiver slips while descending stairs and carrying a child in a child safety seat, serious injuries can occur to the child. In another example, while in a child safety seat a child may be left on a raised surface such as a table, and a pet or sibling may accidentally push the child safety seat off the table, resulting in serious injury.

The modes of use for child safety seats have increased, while the existing child safety seat manufacturers continue to make seats designed for single-mode use (e.g., in a vehicle).

The sites of use for child safety seats have also increased. Previously predominantly used in a vehicle, they are now used more at home (allowing a sleeping child to continue resting in the child safety seat), and in shared transit (rideshare vehicles, public transit, airplanes), and in public spaces.

Additionally, existing child safety seats made of plastic shells and foam offer limited protection to the occupant in a vehicle collision. The amount of energy that can be dissipated by foam is very limited.

Additionally, moving parts in existing child safety seats are prone to mechanical failure, and failure due to misuse by the caregiver. These failures can result in serious injury. For example a rotating basket carry handle on an existing child safety seat may not be properly locked in place when a caregiver removes it from a vehicle; unexpected rotation of the child safety seat then occurs; and, an unrestrained child occupant would fall a few feet onto the ground, face first. Similarly, the use of moving parts in in existing child safety seats to mount to a detachable LATCH base can lead to mechanical failure. The addition of moving parts to a child safety seat typically adds weight, which reduces usability and convenience. The addition of moving parts to a child seat also adds noise: as the parts move, they are more likely to disturb or wake a sleeping child occupant. Benefits of minimizing the number of moving parts are numerous.

What is needed is a device, system, and method of addressing these and related problems.

SUMMARY

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)—(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

BRIEF DESCRIPTION OF THE DRAWINGS

The present disclosure can be better understood by referring to the following figures in order to illustrate the principles of the disclosure. The figures are schematic and are not necessarily drawn to scale. Within the figures, like reference numerals denote like parts providing like functionality.

FIG. 32 is a perspective view of the stroller adapter of FIG. 23, as installed onto a baby stroller and carrying the child safety seat of FIG. 1

DETAILED DESCRIPTION

In various embodiments, the present disclosure provides, a lightweight child safety seat that protects the occupant across multiple modes (carried, belted in, latched in, rocking, at rest on a surface) and sites of use (in a vehicle, out of a vehicle, on public transit, in airplanes, in rideshare vehicles, at home, and places in between). In various embodiment, the present disclosure provides a lightweight child safety seat that offers more protection both in the vehicle, and out of the vehicle. In various embodiments, the present disclosure provides a lightweight child safety seat that minimizes moving parts to improve safety, decrease weight, and make the use of the seat quieter. These features may be combined in whole or in part across various embodiments.

In some cases, embodiment of the present disclosure uses body on frame construction, where the frame of the lower body constrains and directs crash forces, and the upper body absorbs and dissipates crash forces for superlative protection in and out of the car for side impact, front impact, inversions, rolls, and recoil.

The present disclosure is here described in detail with reference to particular embodiments. Other embodiments may be used and/or other changes may be made without departing from the spirit or scope of the present disclosure. The illustrative embodiments described in the detailed description are not meant to be limiting of the subject matter presented here.

Figure 1:
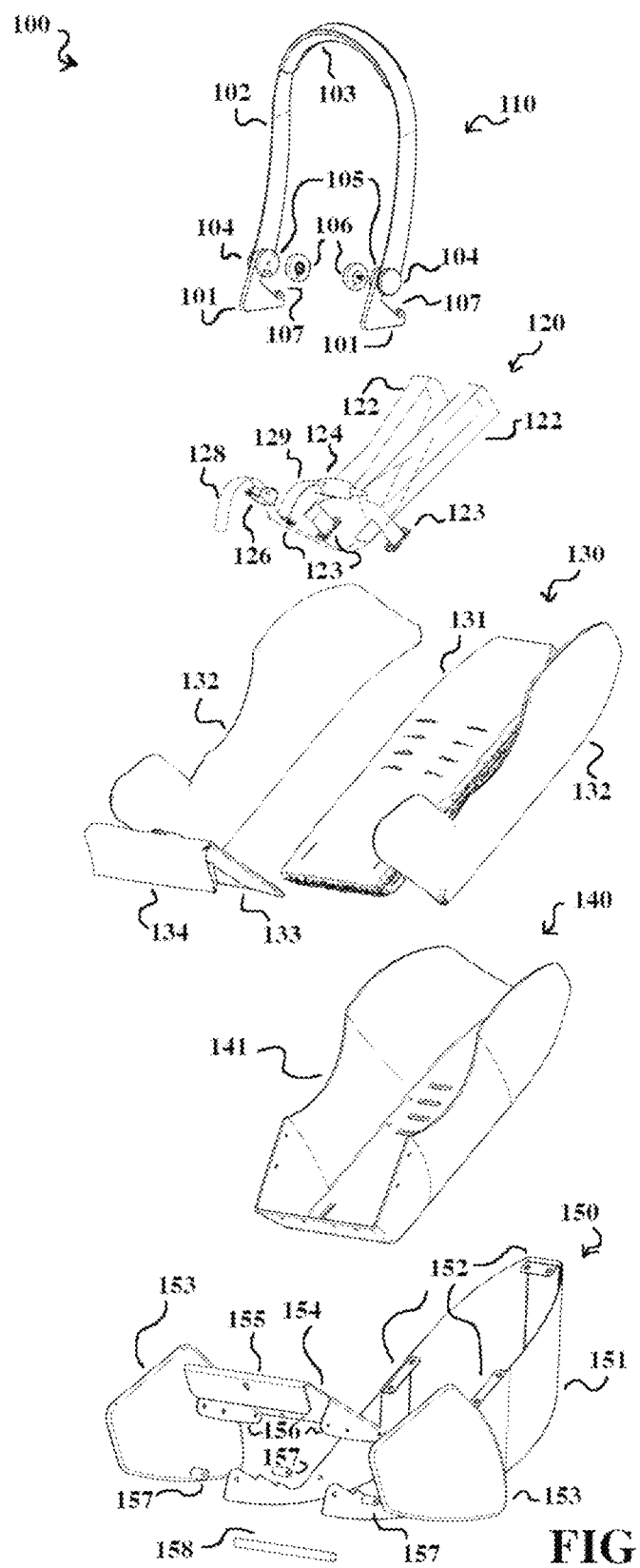
FIG. 1 is an exploded perspective view of a child safety seat according to aspects of the present disclosure.
Figure 2:
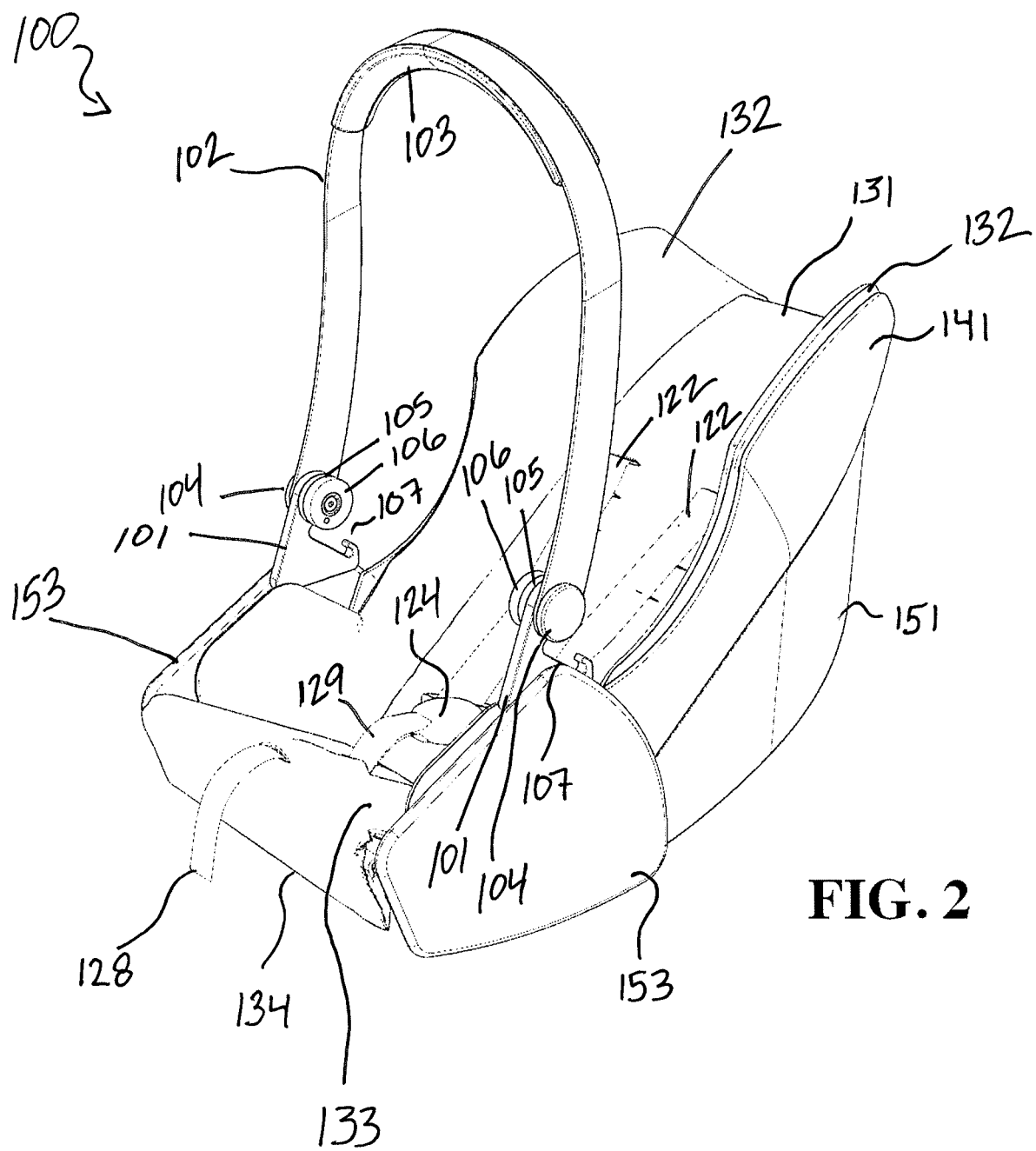
FIG. 2 is a perspective view of the child safety seat of FIG. 1.
Figure 3:
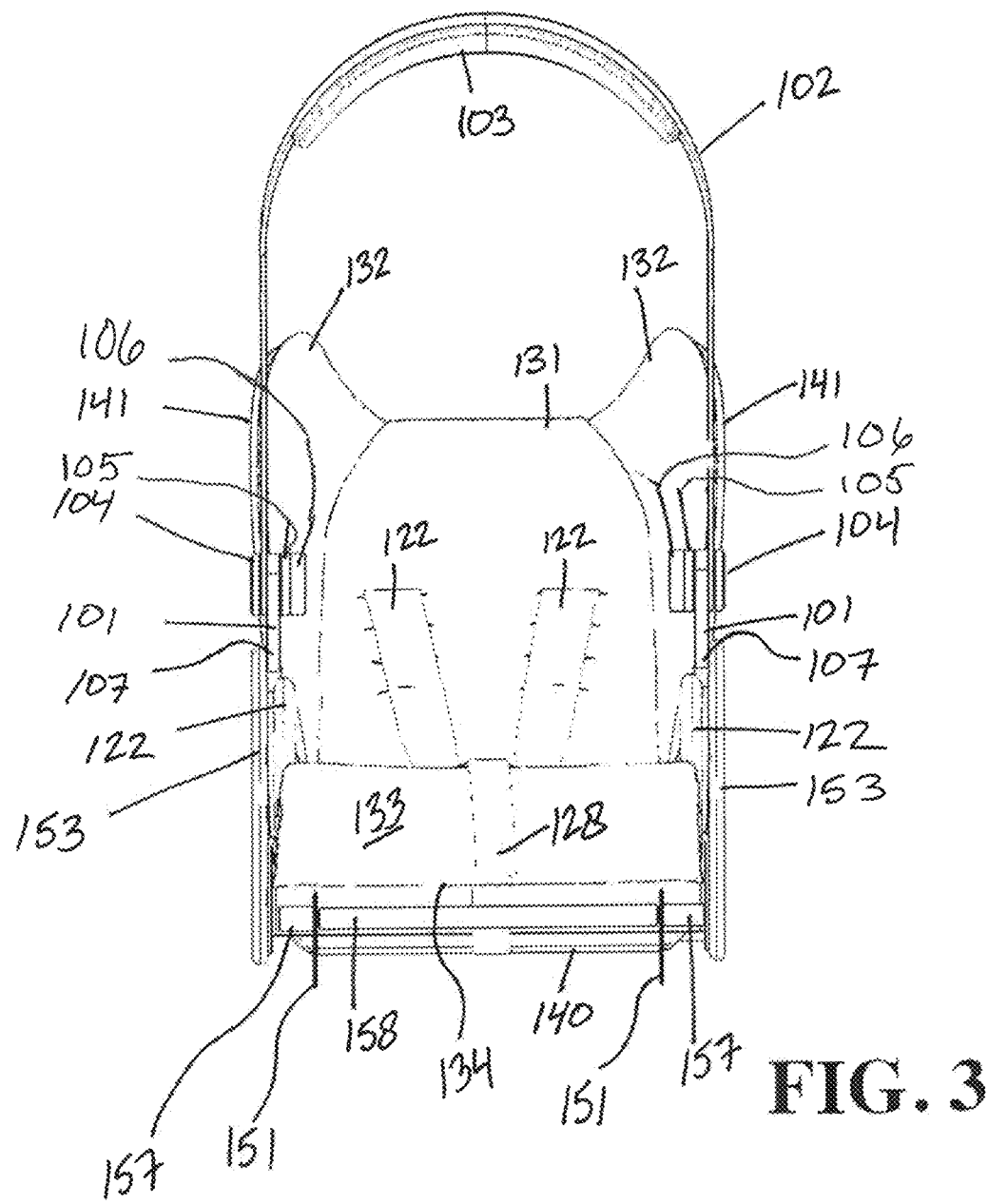
FIG. 3 is a front view of the child safety seat of FIG. 1
Figure 4:
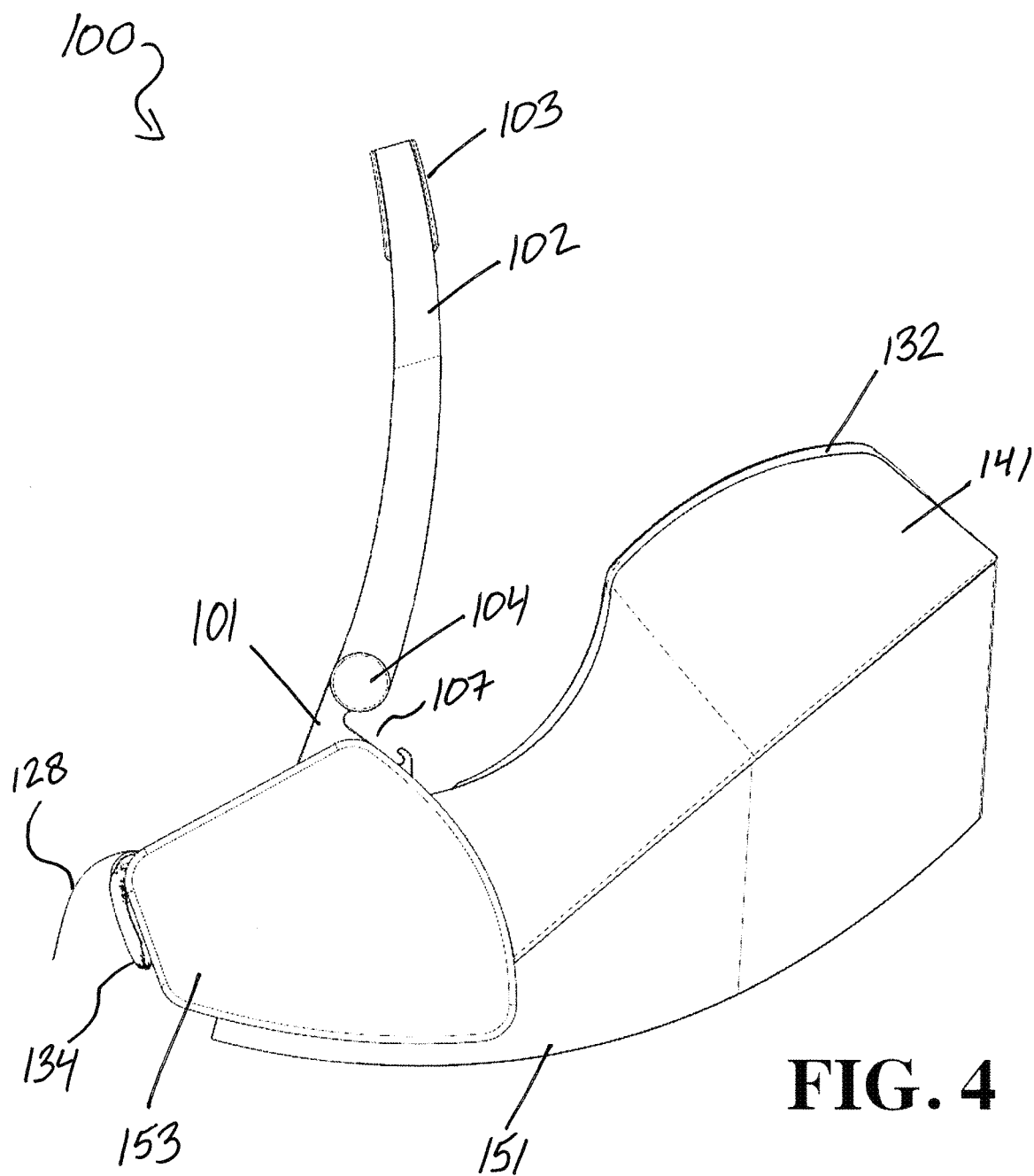
FIG. 4 is a right side view of the child safety seat of FIG. 1.
Figure 5:
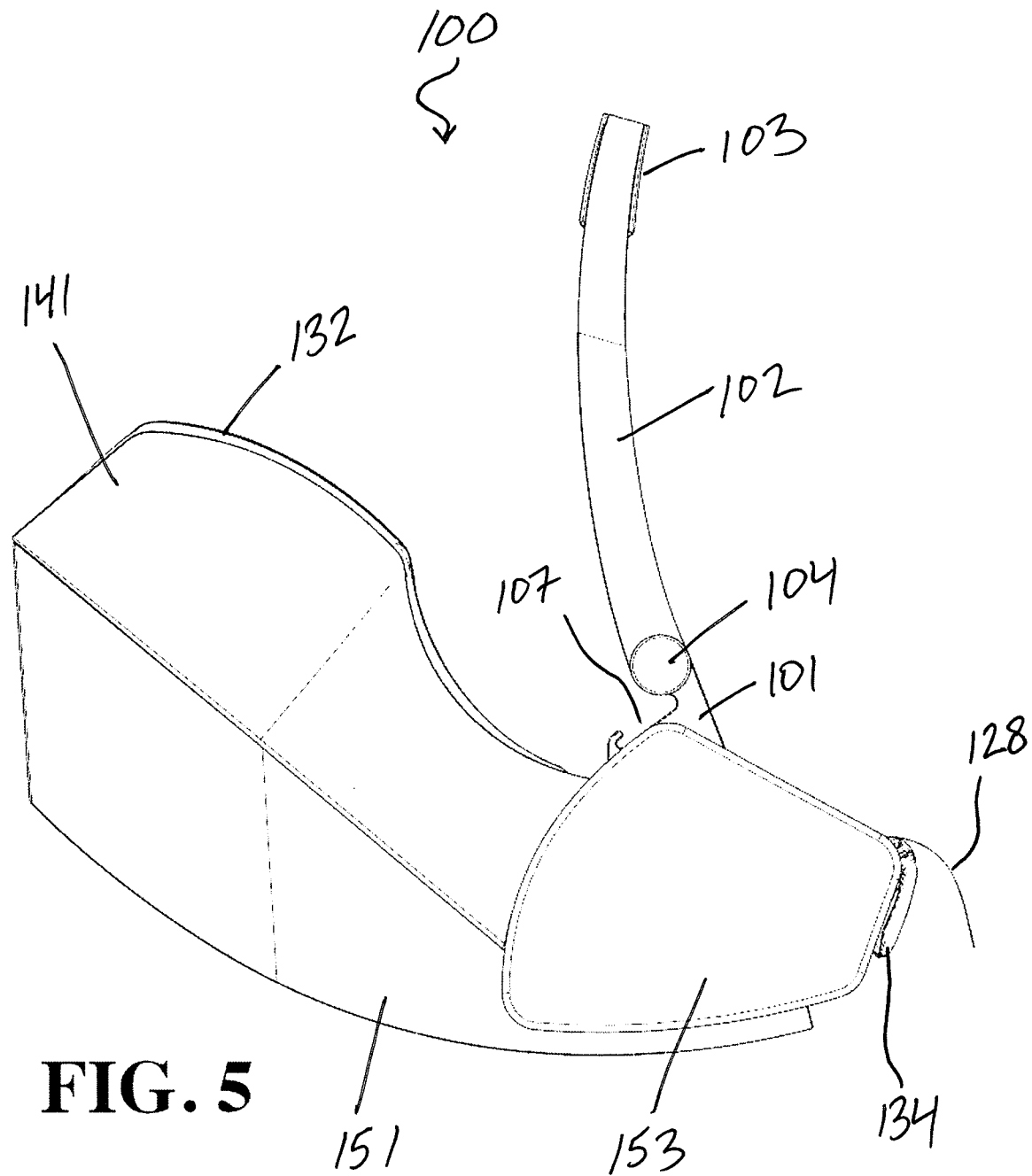
FIG. 5 is a left side view of the child safety seat of FIG. 1.
Figure 6:
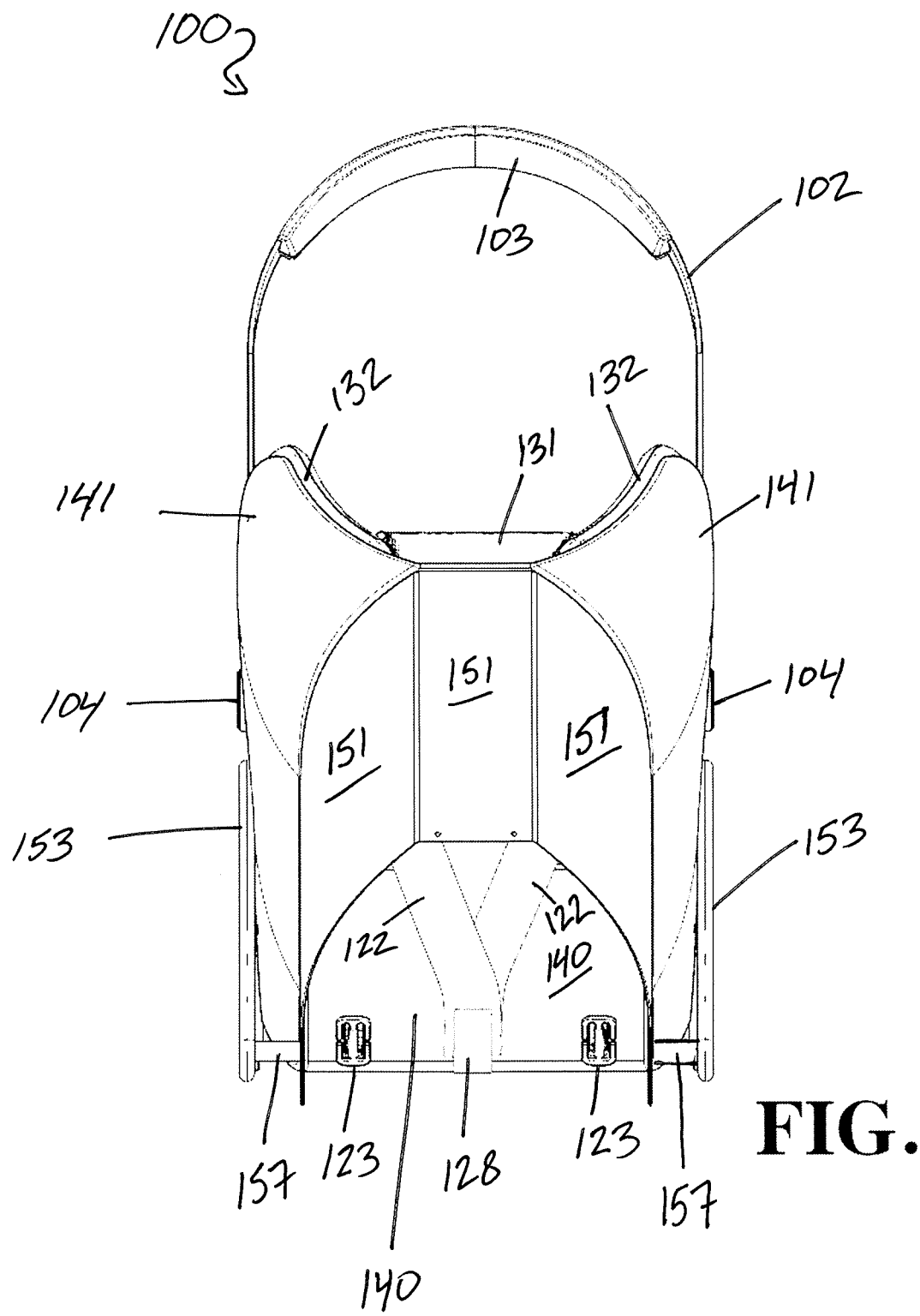
FIG. 6 is a rear view of the child safety seat of FIG. 1.
Figure 7:
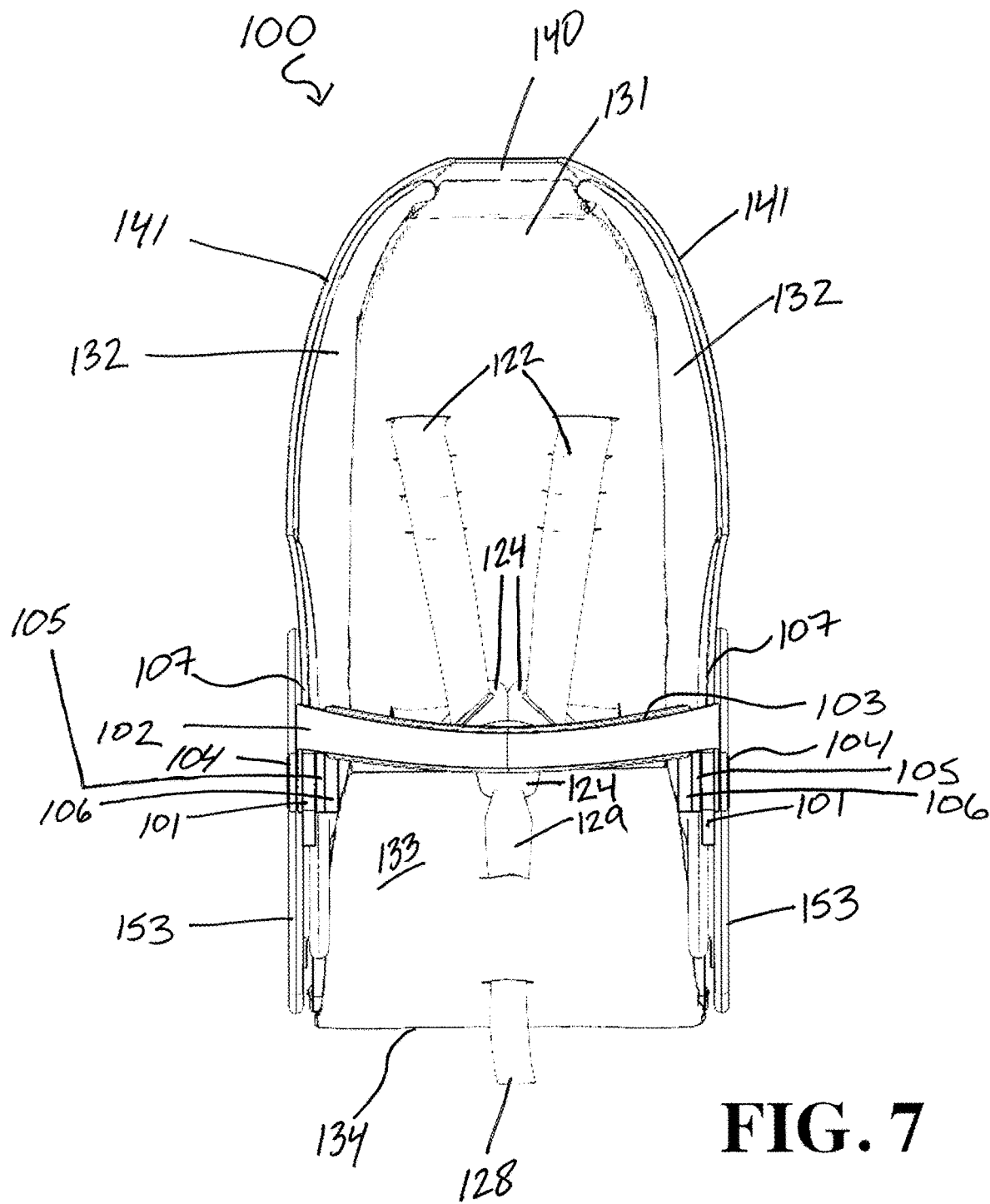
FIG. 7 is a top side view of the child safety seat of FIG. 1.
Figure 8:
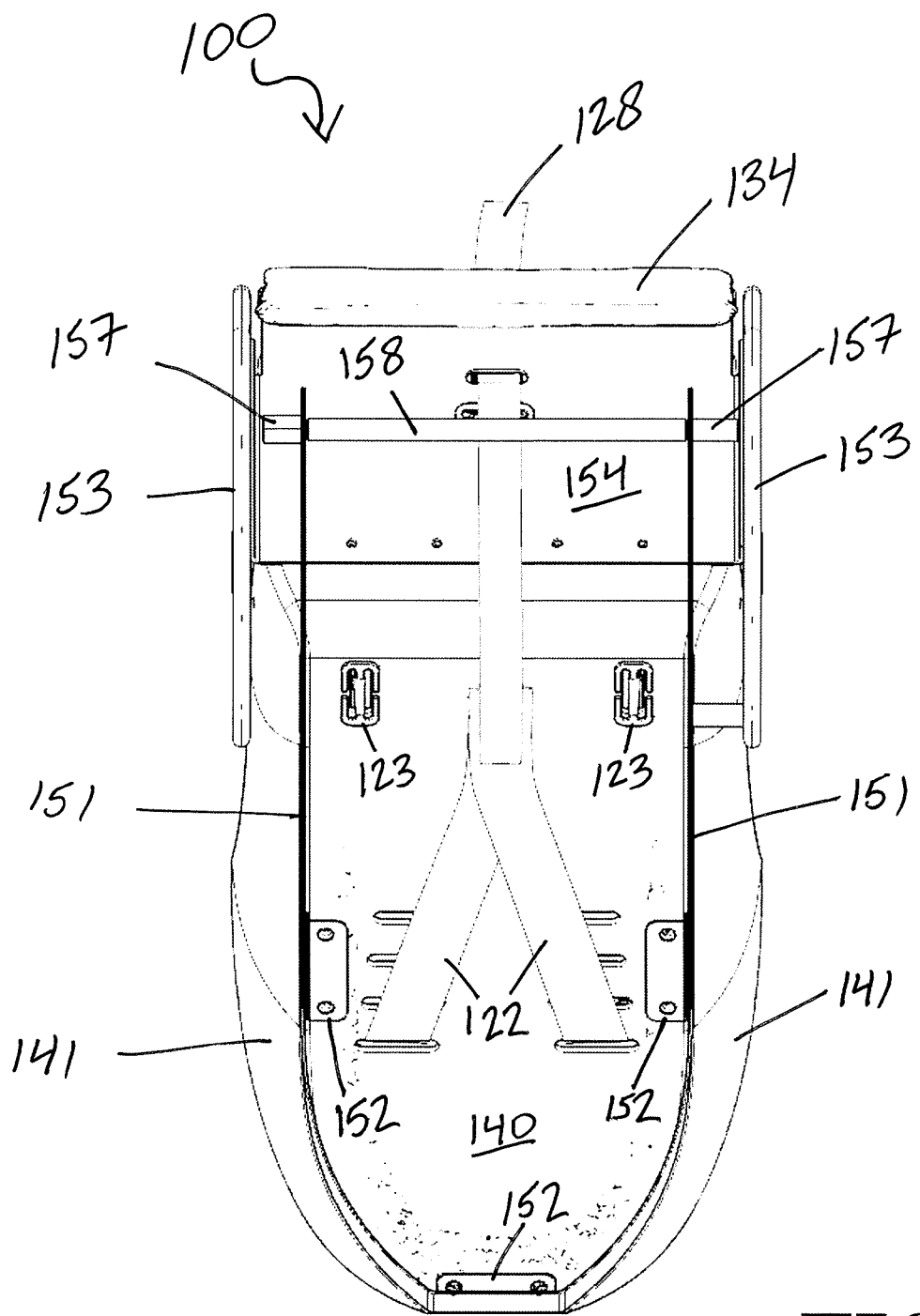
FIG. 8 is a bottom side view of the child safety seat of FIG. 1.
Figure 9:
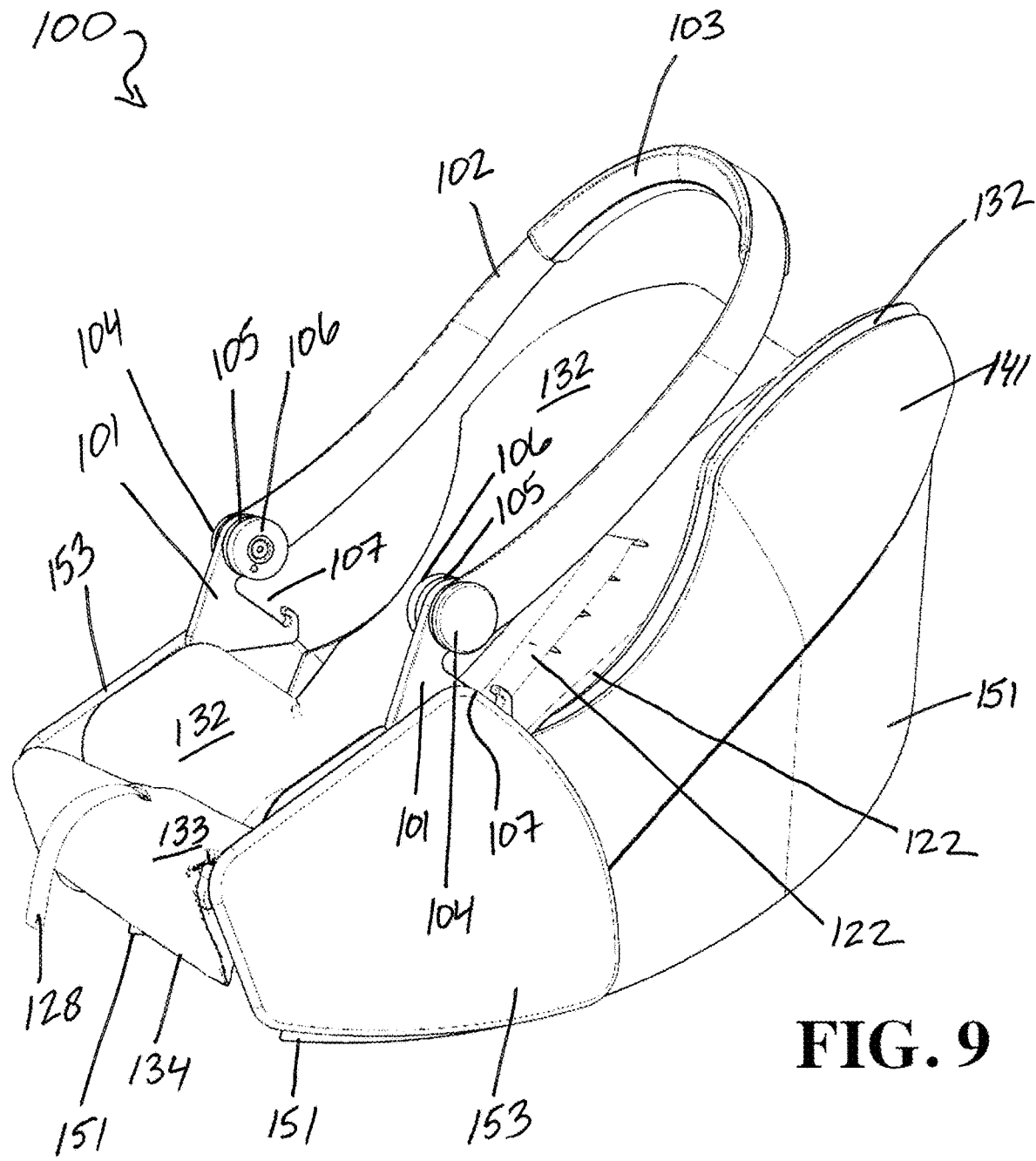
FIG. 9 is a left side view of the child safety seat of FIG. 1, showing the handle in a reclined position.

Referring now to FIG. 1, an exploded view of a child safety seat 100, according to aspects of the present disclosure is shown. FIGS. 2-9 illustrate various exterior views.

The child safety seat 100 may include handle 110, harness system 120, interior padding 130, chassis shell 140, frame 150.

The handle 110 may include mounting assembly 101, basket arm 102, grip 103, exterior axle assemblies 104, interior axle assemblies 105, locking assemblies 106, and seat belt mounting points 107. In some alternative embodiments, basket arm 102 and grip 103 may be combined into a single piece. In some alternative embodiments, basket arm 102 may be composed of multiple pieces. Child safety seat 100 may be installed into an automobile seat in a rear-facing position with the automobile's seat safety belt passing through the seat belt mounting points 107. Locking assemblies 106 may use acceleration-based locking mechanisms such as viscous dampers, friction locks, centrifugal locks, rotary dampers, or inertia locks.

The harness system 120 may comprise a five-point safety harness to be fitted to a child. The harness system 120 may include all or part of hip and shoulder straps or safety belt straps 102, harness stop plates 103, buckle assembly 104 with center release button, quick release clamp 106, quick release strap 108, and crotch strap 109.

Interior padding 130 may comprise interior padding back 131, interior padding side-impact supports 132, and padding bottom 133. The interior padding back 131 may further include slots for the passage of hip and shoulder belt straps 102 of child safety seat 100. The interior padding bottom 133 may further include slots for the passage of quick release strap 106 and crotch strap 109 of child safety seat 100. The interior padding bottom 133 may further include a padded grip 134.

The chassis shell 140 directly or indirectly integrates the other components of the car child safety seat 100. The chassis shell 140 may be formed as an interrupted shell 141 that has side-impact protecting walls. The chassis shell 140 may further include slots for the passage of hip and shoulder belt straps 102, quick release strap 106, and crotch strap 109 of child safety seat 100. The chassis shell 140 may further include multiple holes to accommodate mounting and integrating with other components of the car child safety seat 100. In some alternative embodiments, chassis shell 140 could be formed from a single piece or multiple pieces.

The frame 150 may comprise rail assembly 151, brackets 152, side plates 153, bottom plate 154, bottom plate front tab 155, bottom plate side tabs 156, cylinders 157, and rod 158. The bottom edge of frame 150 is arcuate, to allow for a full rocking motion. The frame 150 may further include slots for the passage quick release strap 106 and crotch strap 109 of child safety seat 100. In some alternative embodiments, the bottom edge of frame 150 may be edged with rubber trim. In some alternative embodiments, the bottom of edge of frame 150 could be flat. In some alternative embodiments, one or more components of frame 150 could be formed as a single piece or component.

Figure 10:
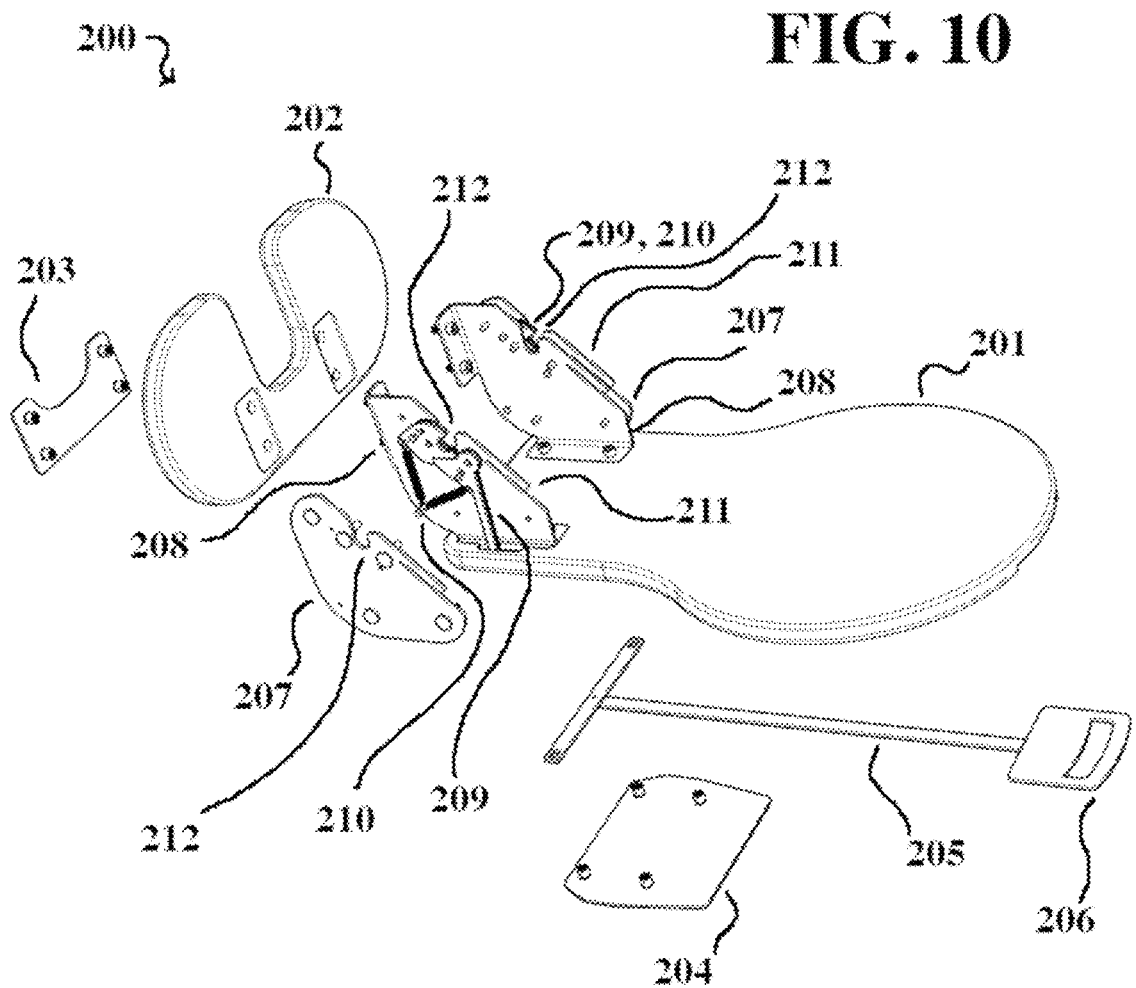
FIG. 10 is an exploded perspective view of a detachable base for use with a child safety seat according to aspects of the present disclosure.
Figure 11:
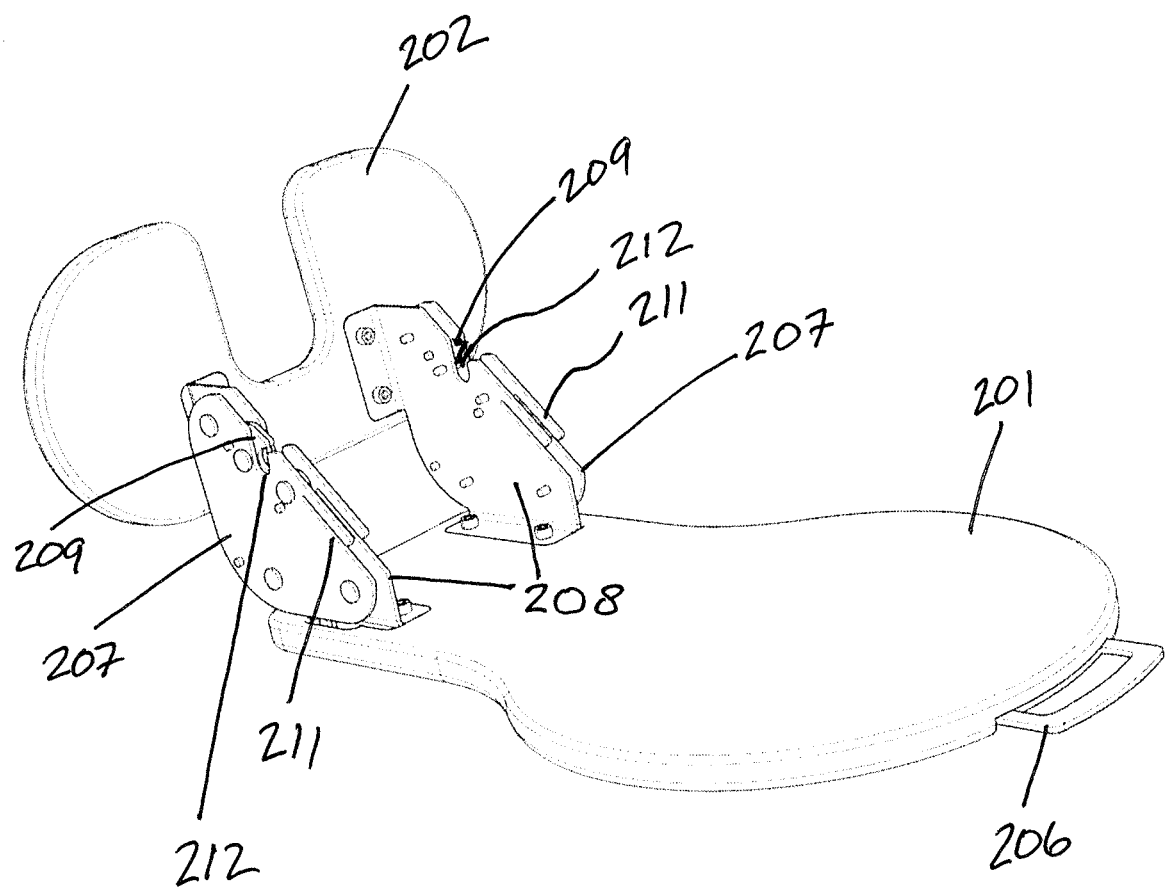
FIG. 11 is a rear perspective view of a detachable base of FIG. 10.

Referring now to FIG. 10, an exploded perspective view of the detachable base 200, according to aspects of the present disclosure is shown. FIGS. 11-22 illustrate various exterior views.

The detachable base 200 may include bottom plate 201, foot plate 202, foot plate mounting assembly 203, bottom plate mounting assembly 204, strut assembly 205, handle 206, exterior plates 207, interior plates 208, latch parts 209, springs 210, safety belt slots 211, and installation channels 212.

Bottom plate 201 is flat and smooth to minimize any damage to the automobile seat surface. Foot plate 202 is flat and smooth to minimize any damage to the upright automobile seat surface.

Bottom plate 201 is low profile to minimize the amount of energy a caregiver expends lifting child safety seat 100 onto detachable base 200.

Bottom plate 201 is flat and smooth to allow a caregiver to rotate child safety seat 100 while the latter is atop detachable base 200.

Foot plate 202, as part of detachable base 100, helps to dissipate recoil forces in a frontal automobile collision. Foot plate 202, as part of detachable base 100, helps to dissipate forces in a rear automobile collision.

Figure 12:
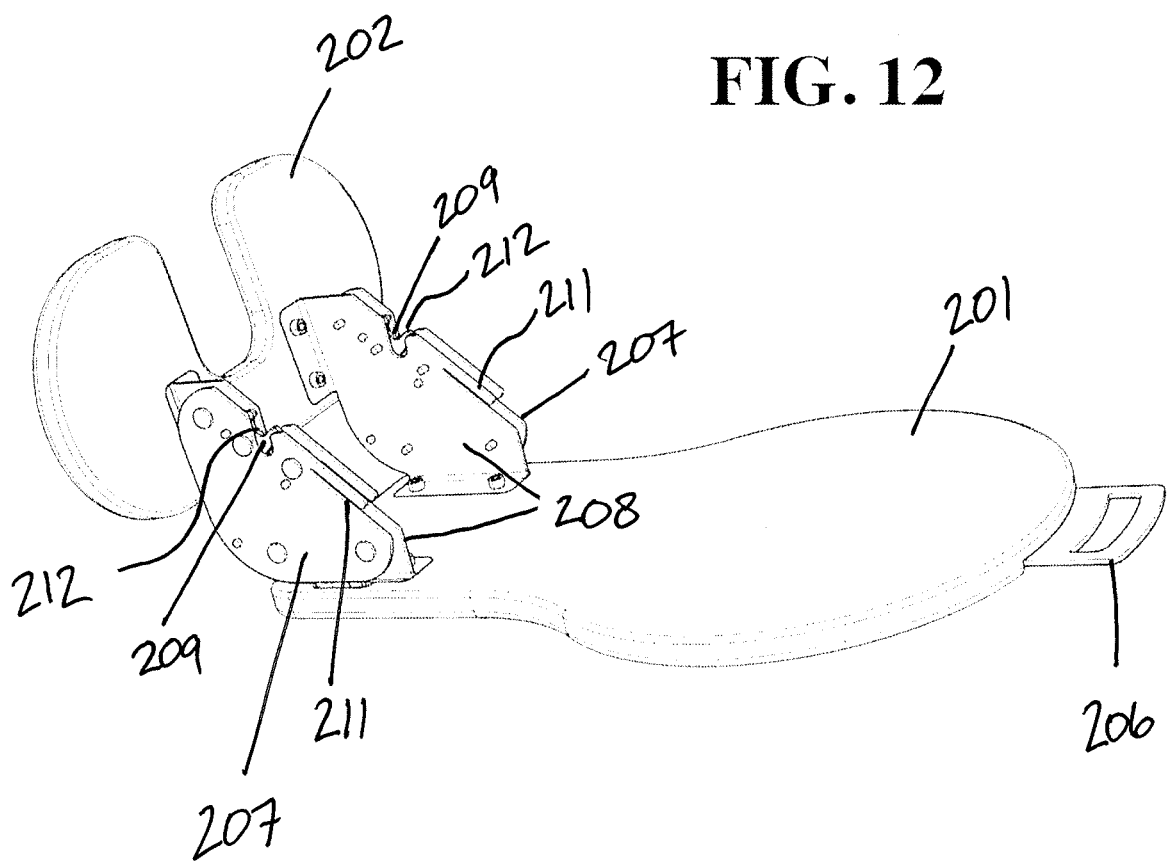
FIG. 12 is a rear perspective view of a detachable base of FIG. 10, when it is open and unlocked.
Figure 13:
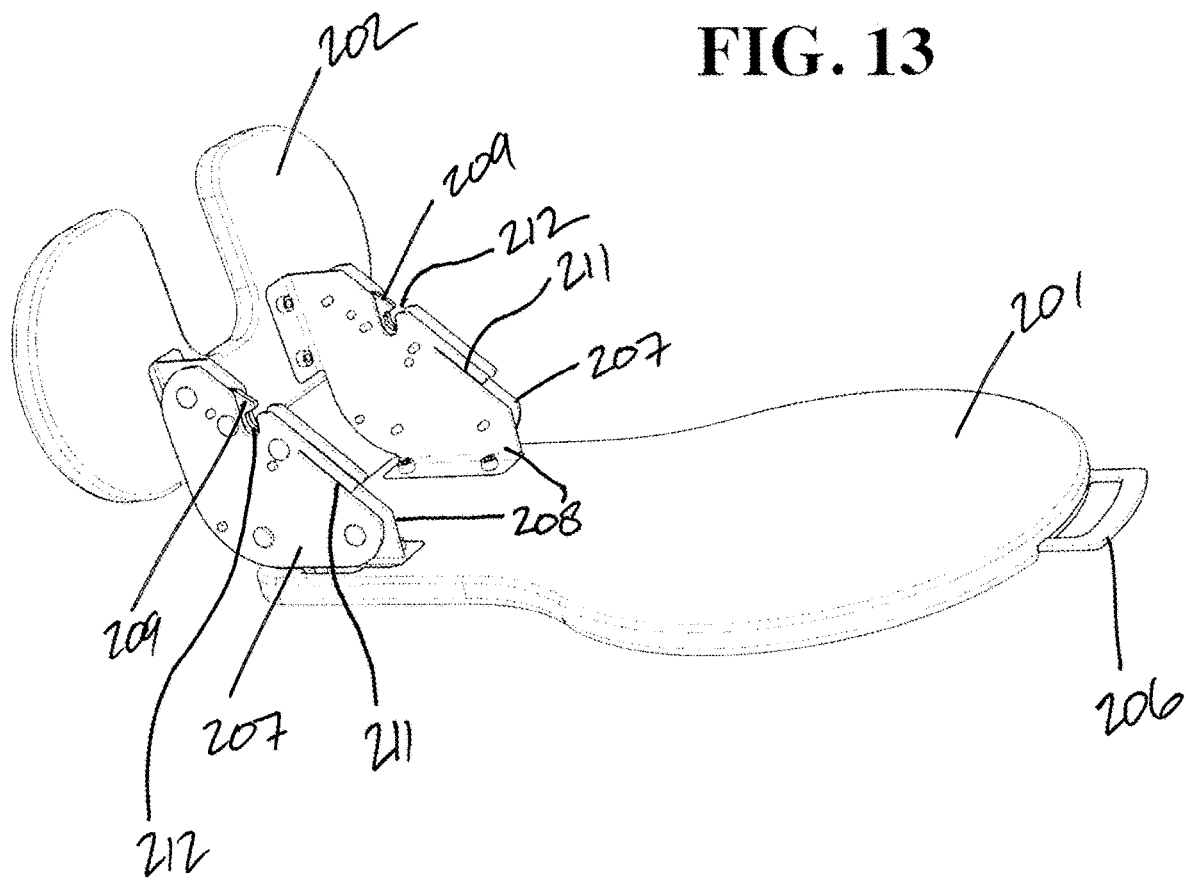
FIG. 13 is a rear perspective view of a detachable base of FIG. 10, when it is locked.

The detachable base 200 is designed to minimize user errors that occur due to non-obviousness. Installation channels 212 receive the rod 158 of child safety seat 100. The installation channels 212 in combination with latch parts 209 and springs 210 may also be referred to in combination as jaws, and the jaws may be open (unlocked) or closed (locked). Referring now to FIG. 12, if handle 206 is extended beyond its resting and retracted position, it is a visual indication of a failed installation. The means the jaws are open and unlocked, and that the child safety seat 100 is not correctly installed onto detachable base 200. Referring now to FIG. 13, when the rod 158 is pushed into both the left and right installation channels 212, the successful installation of child safety seat 100 is visually indicated by the retraction of handle 206.

Figure 14:
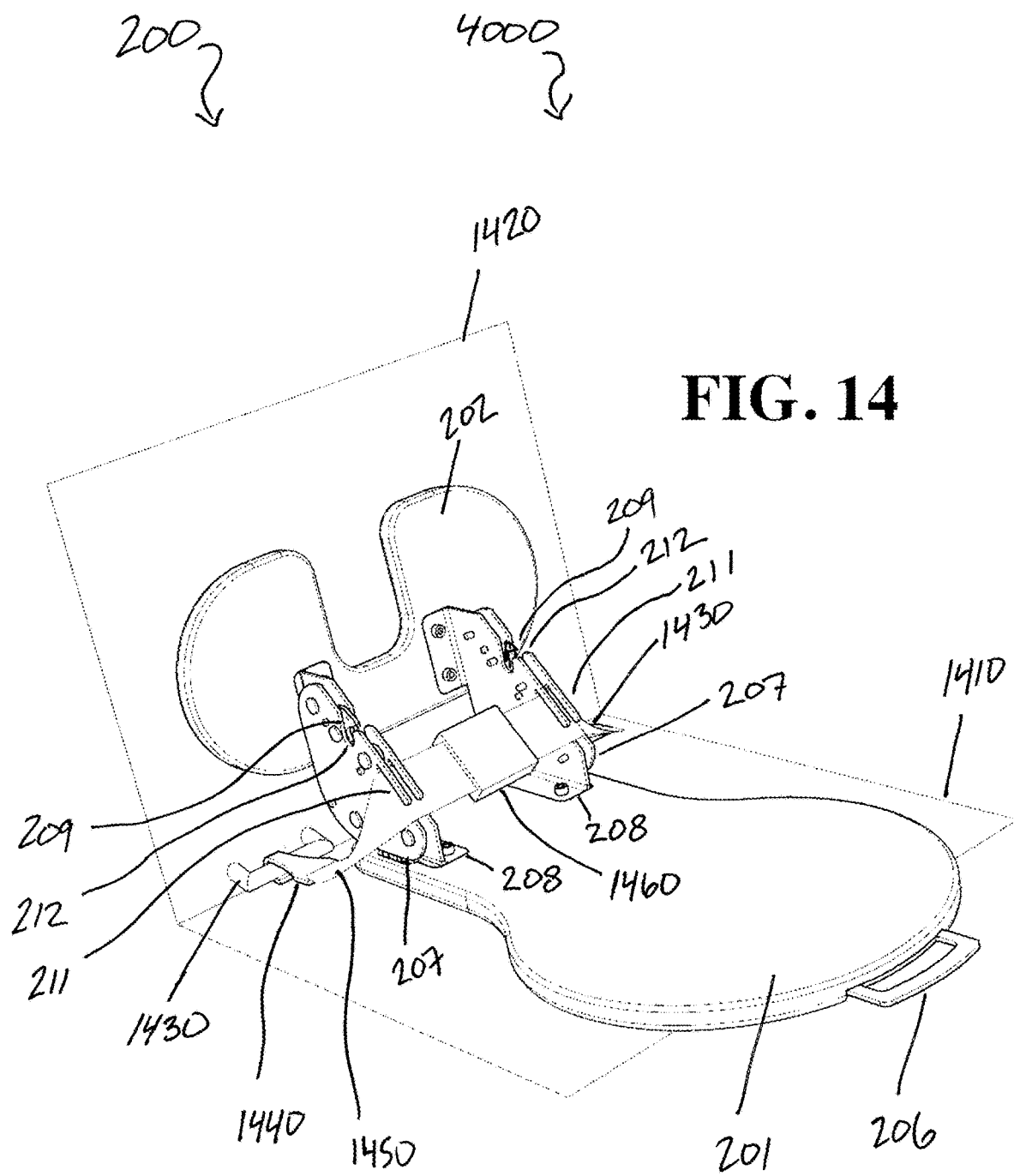
FIG. 14 is a rear perspective view of a detachable base of FIG. 10, as installed into an automobile seat using the lower LATCH anchors with safety belt with LATCH hooks.
Figure 15:
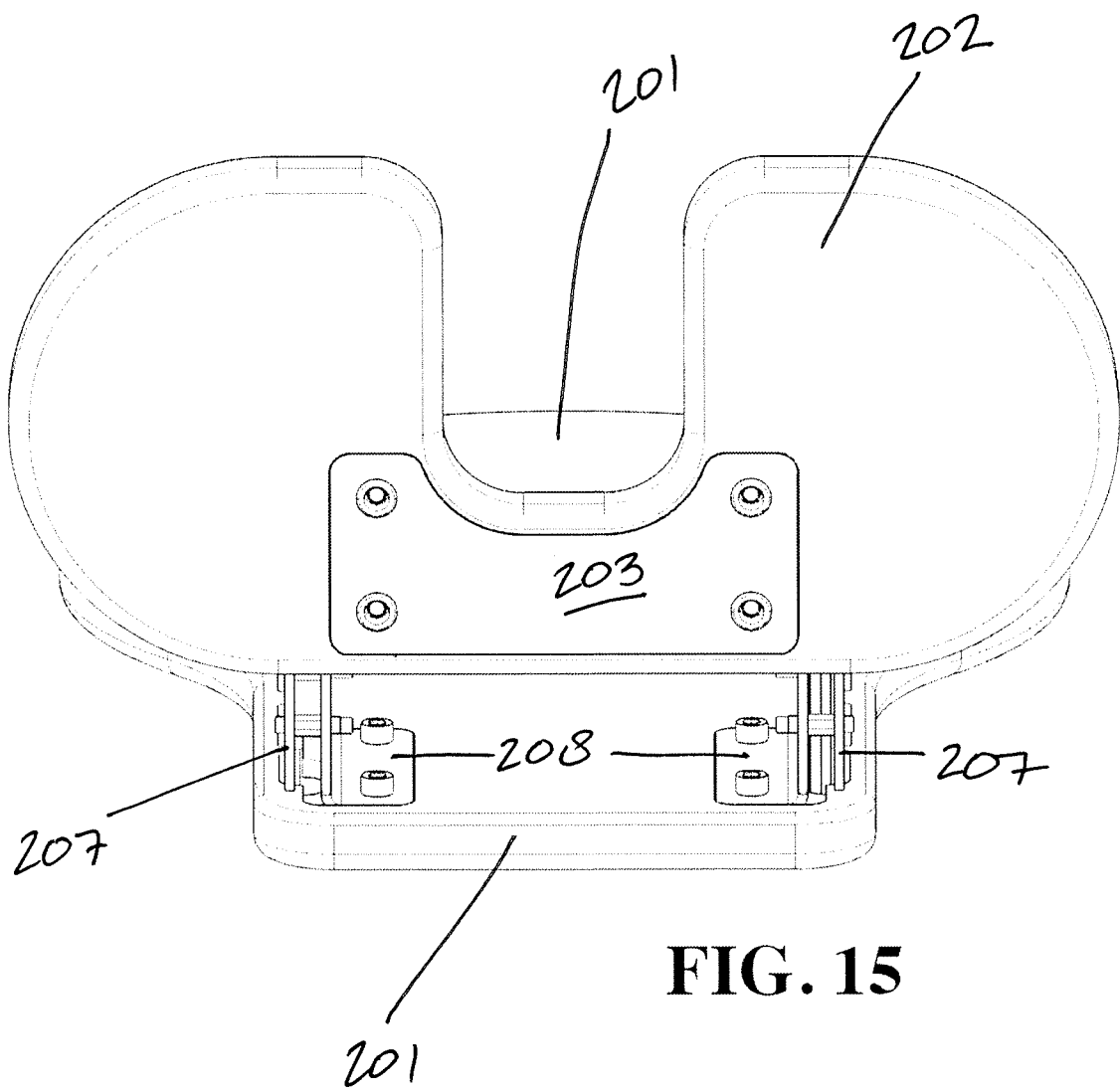
FIG. 15 is a front view of the detachable base of FIG. 10.
Figure 16:
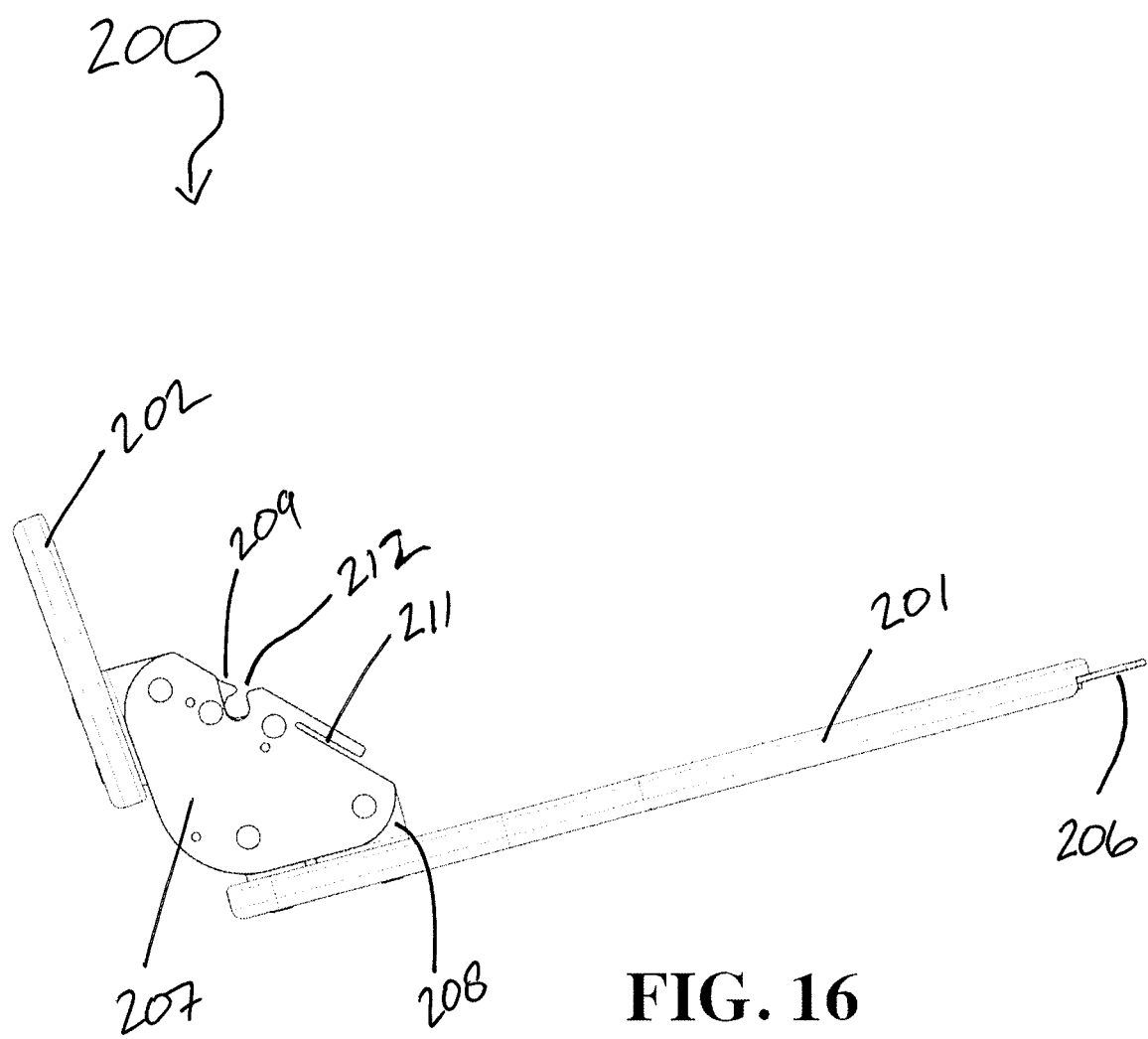
FIG. 16 is a right side view of the detachable base of FIG. 10.
Figure 17:
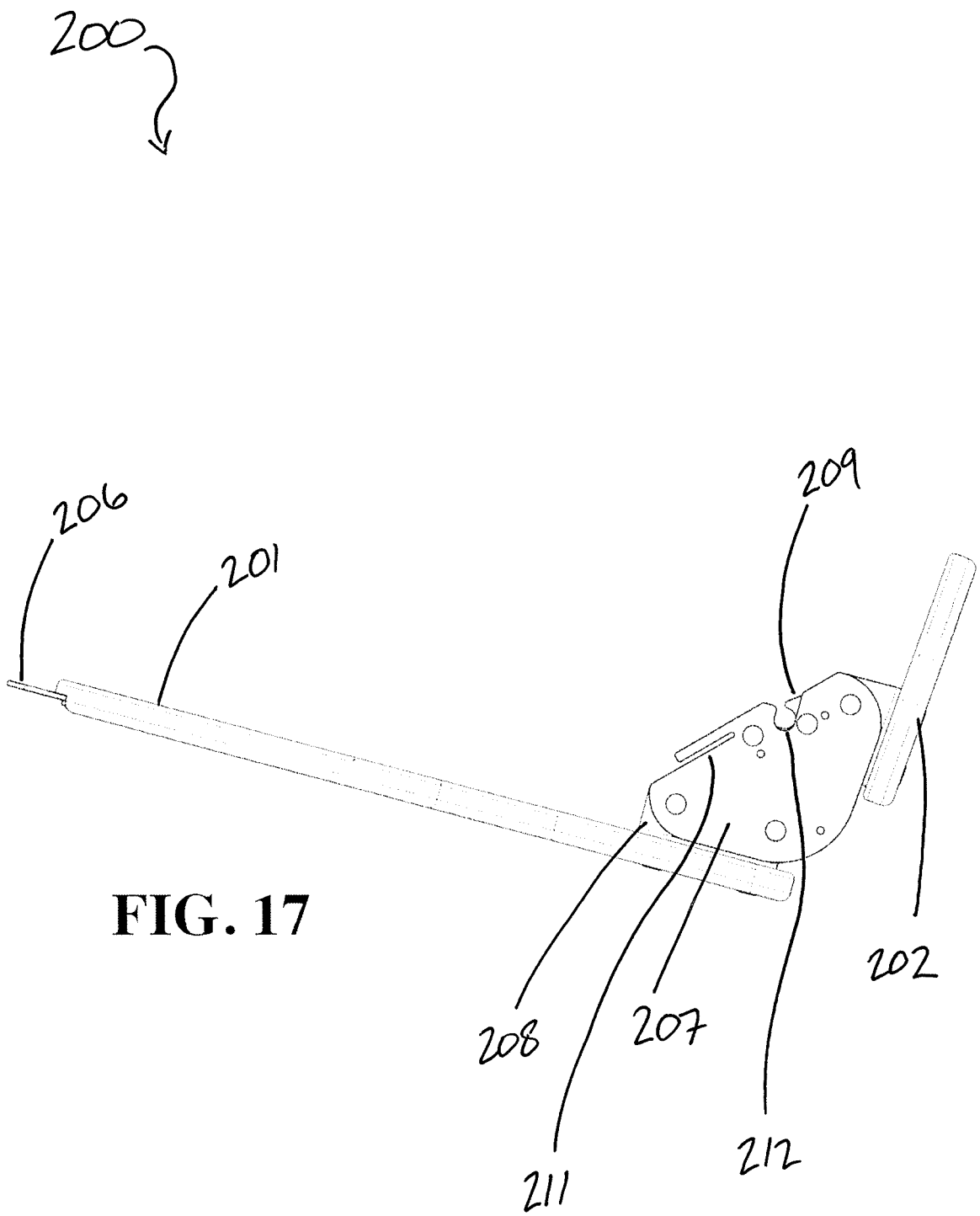
FIG. 17 is a left side view of the detachable base of FIG. 10.
Figure 18:
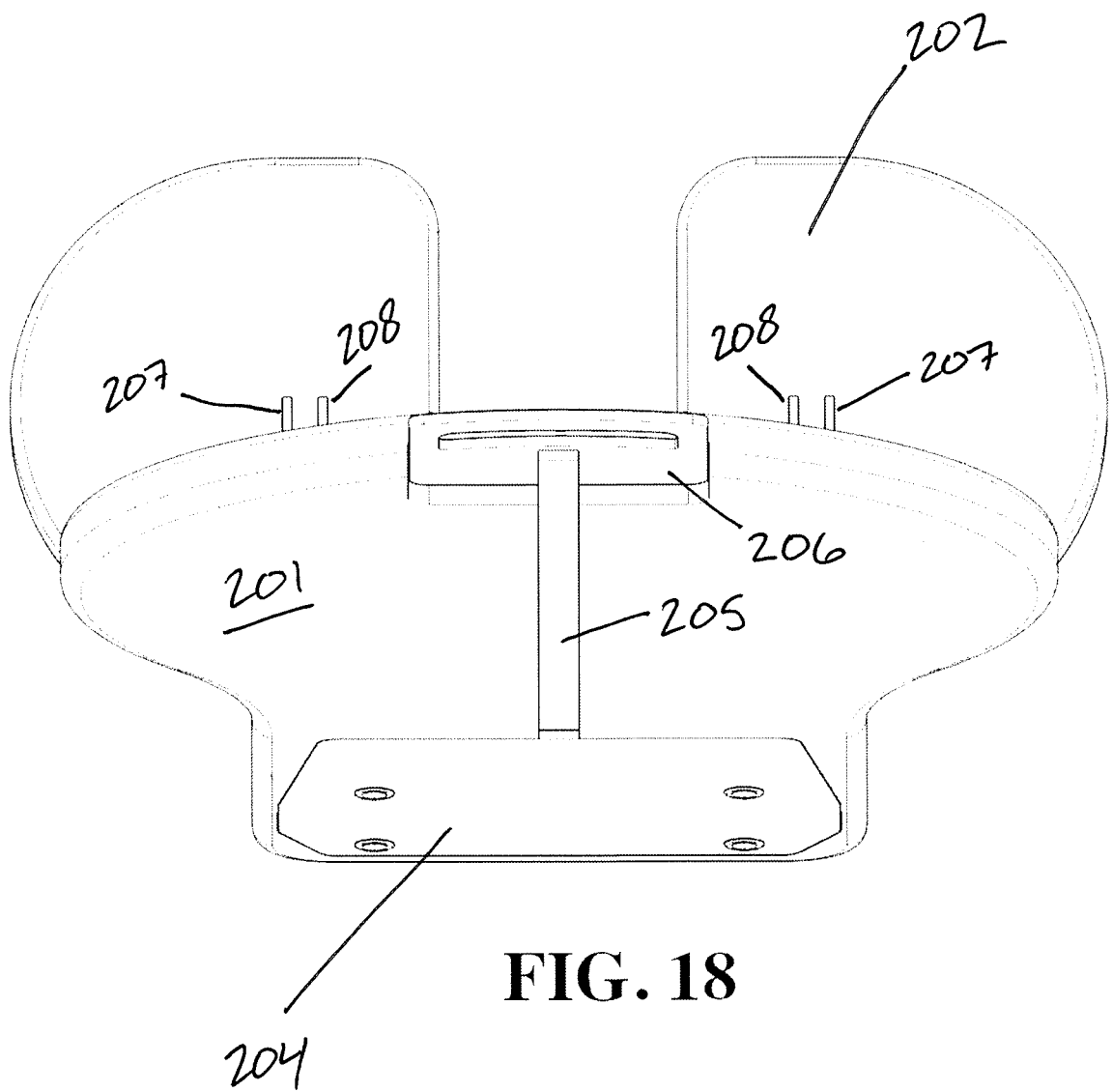
FIG. 18 is a rear view of the detachable base of FIG. 10.
Figure 19:
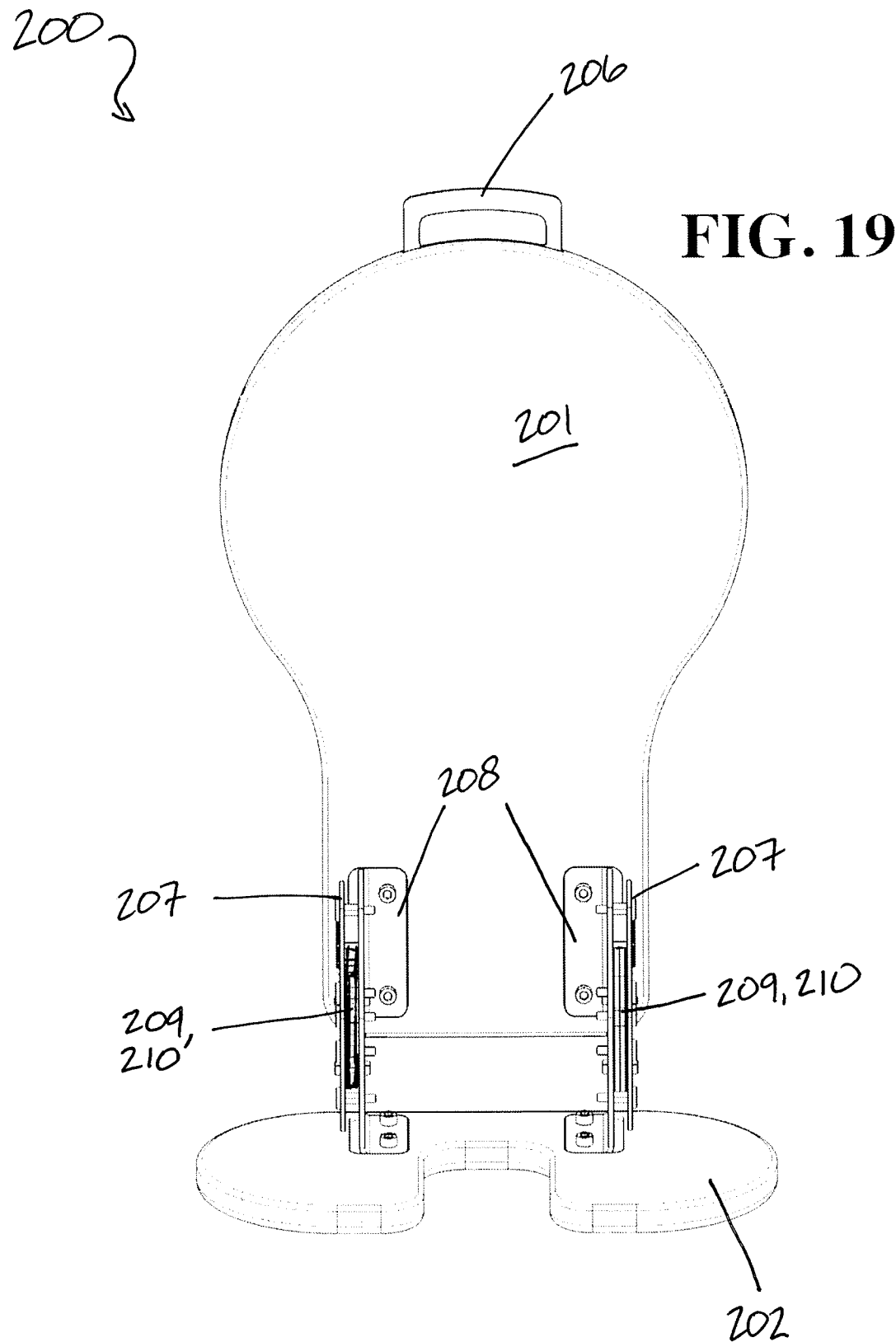
FIG. 19 is a top view of the detachable base of FIG. 10.
Figure 20:
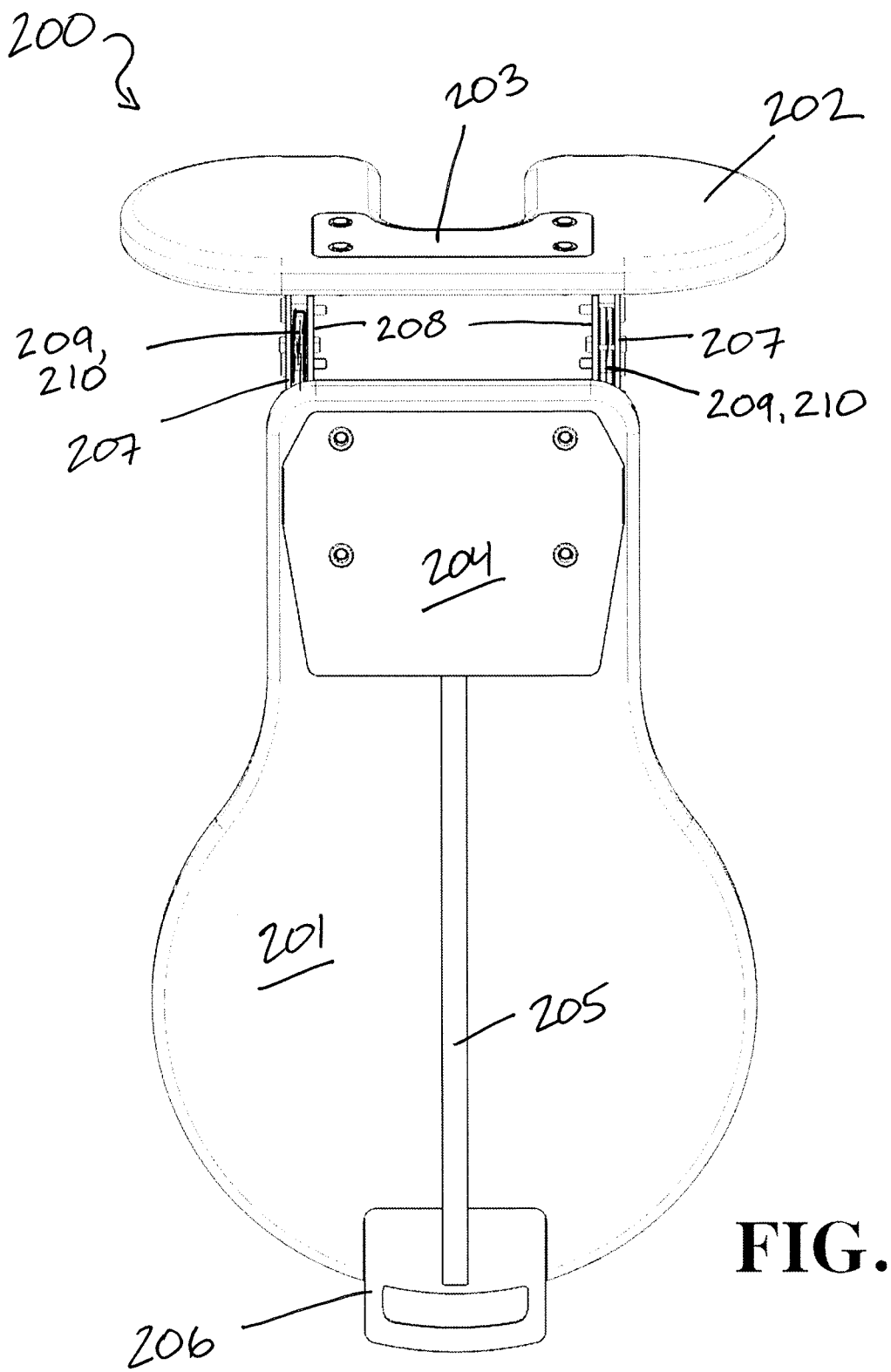
FIG. 20 is a bottom view of the detachable base of FIG. 10.
Figure 21:
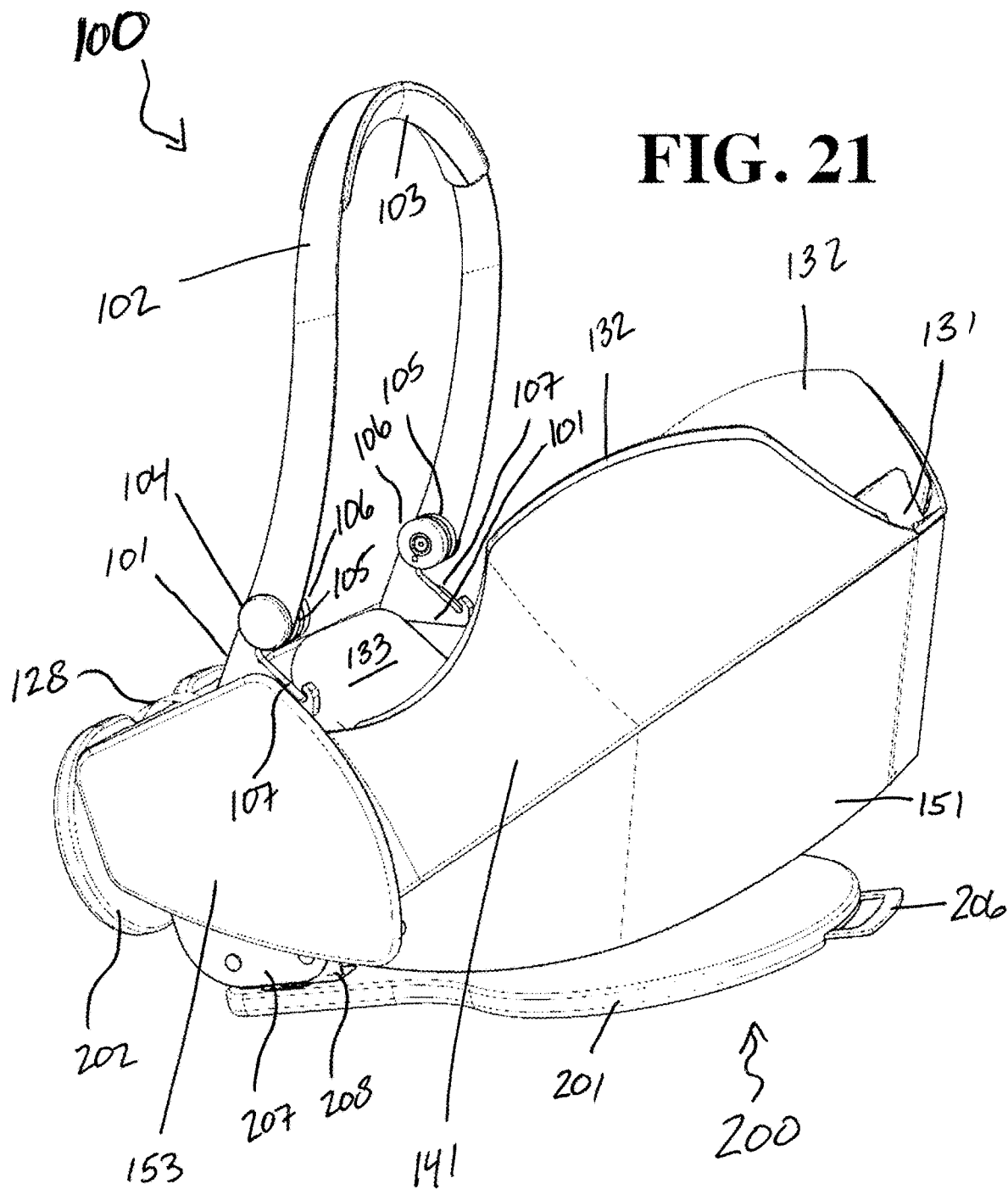
FIG. 21 perspective view of the child safety seat of FIG. 1 as installed onto the detachable base of FIG. 10.

Referring to FIG. 14, the detachable base 200 is installed onto an automobile seat with a separate safety belt with LATCH hooks to the automobile's lower LATCH anchors. Alternatively, the detachable base 200 can be installed using the automobile's own seat safety beat.

Figure 22:
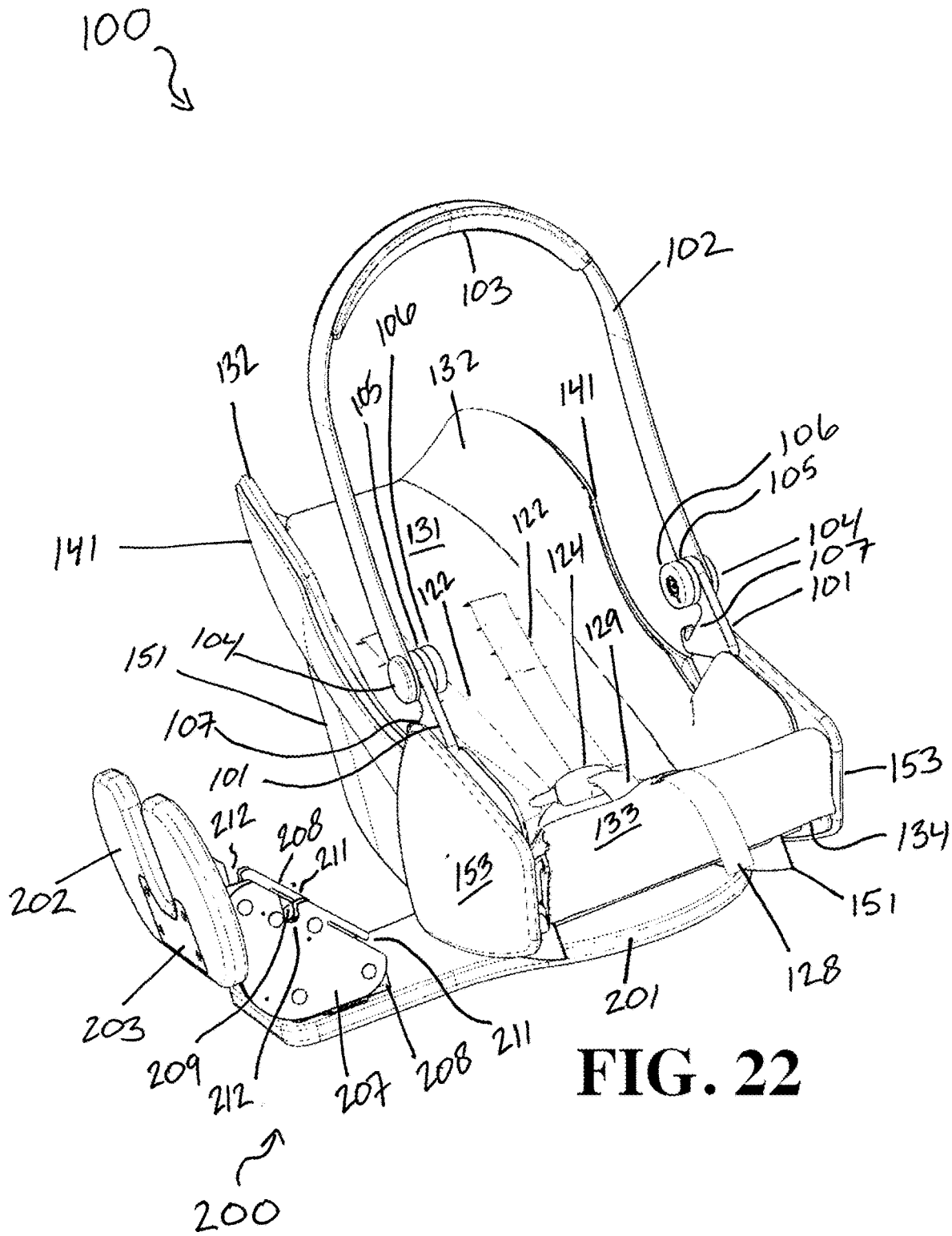
FIG. 22 perspective view of the child safety seat of FIG. 1 as it is being side-loaded for installation onto the detachable base of FIG. 10.

Referring to FIG. 22. a perspective view of the child safety seat 100 as it is being side-loaded for installation onto the detachable base 200. The flat top of bottom plate 201 and its low profile makes it easier to rotate child safety seat 100. A caregiver can lift child safety seat 100 into the automobile onto detachable base 200, and then rotate child safety seat 100 into the installation position on detachable base 200. This has a number of advantages for a caregiver. In the side-loaded position, a caregiver has easier access to the baby in child safety seat 100 to buckle them into harness system 120 of child safety seat 100 or unbuckle them from harness system 120 of child safety seat 100. Similarly, many caregivers find it less exerting to use a sideways loading method.

Figure 23:
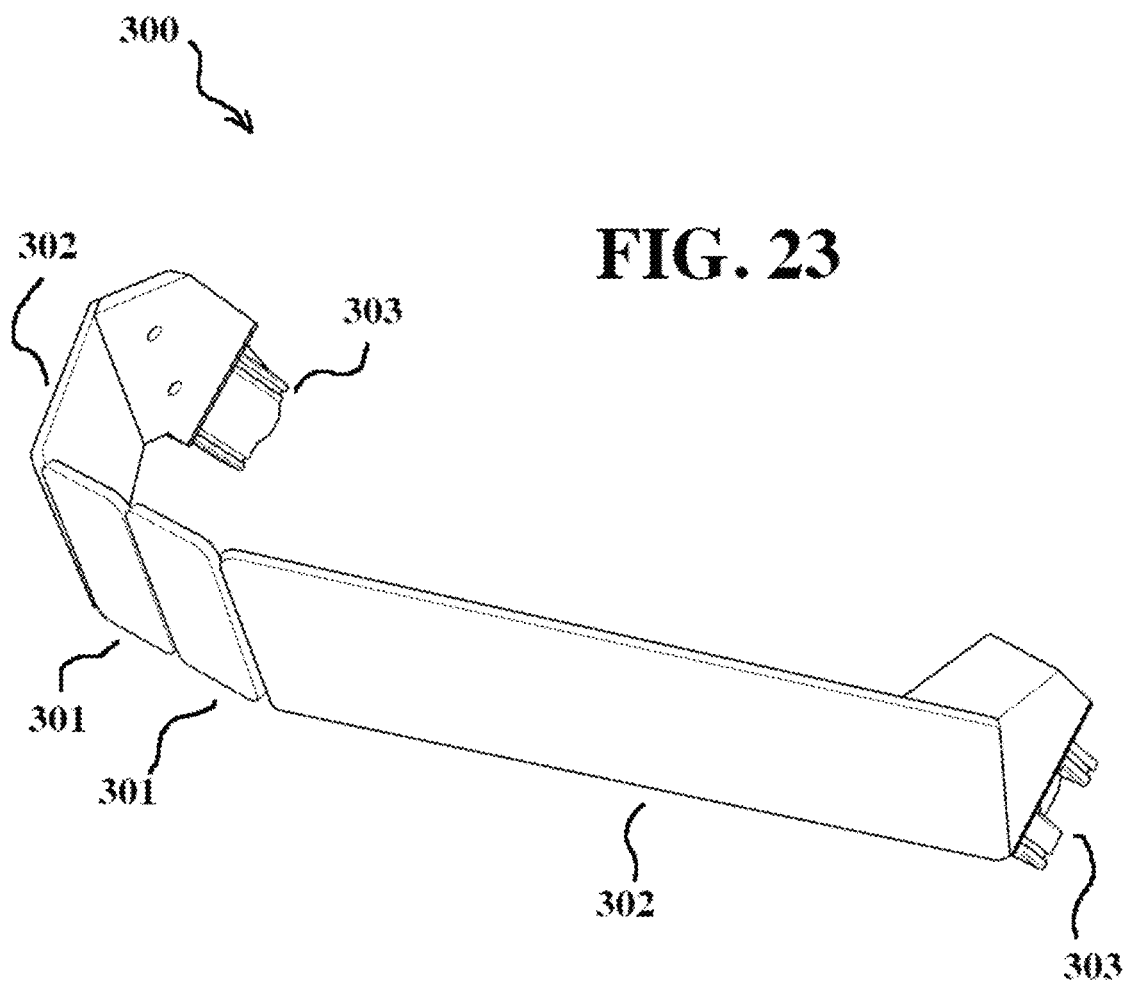
FIG. 23 is a perspective view of a stroller adapter, so that a child safety seat can be easily carried by a baby stroller.
Figure 24:
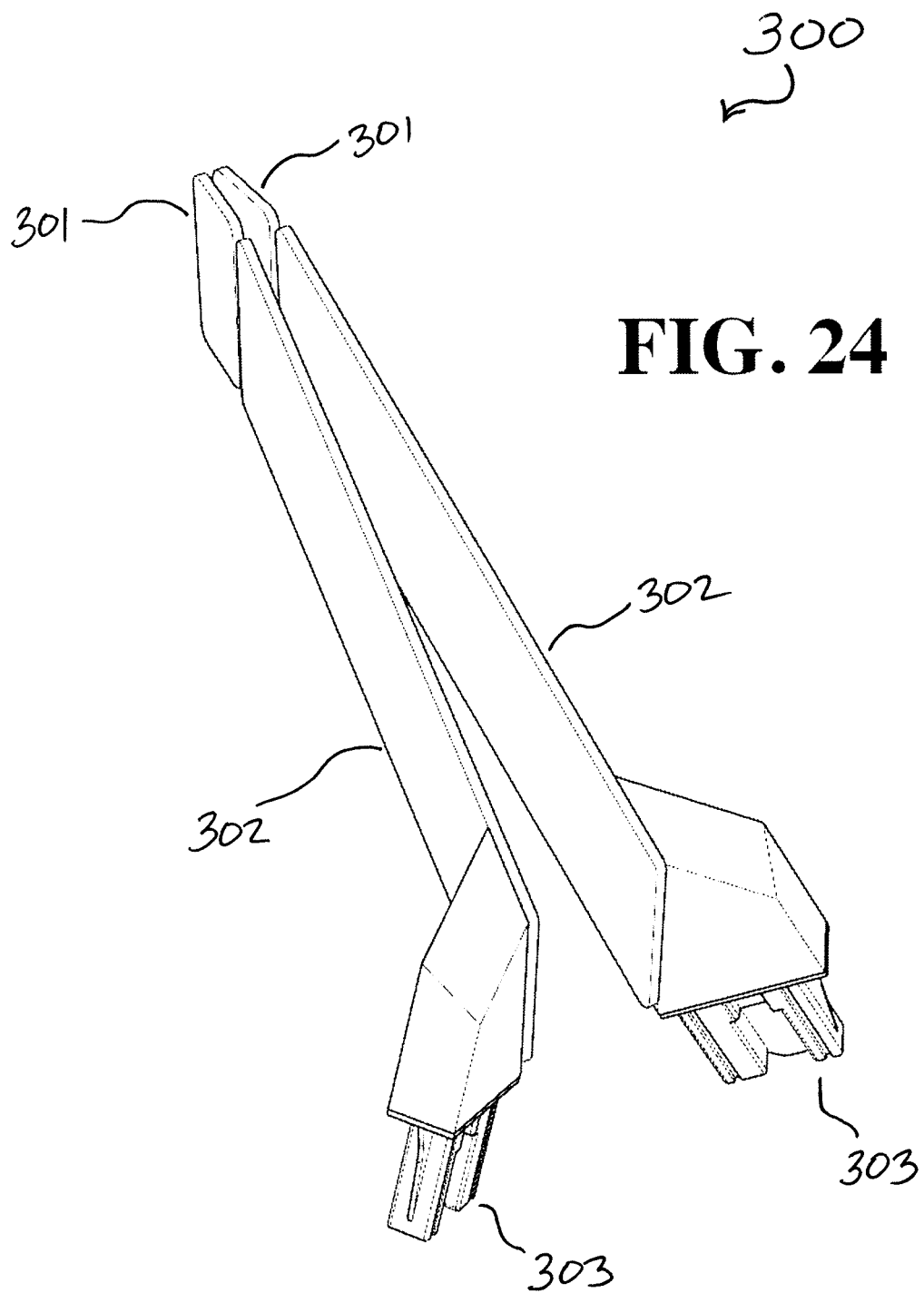
FIG. 24 is a perspective view of the stroller adapter of FIG. 23, folded and ready for storage.
Figure 25:
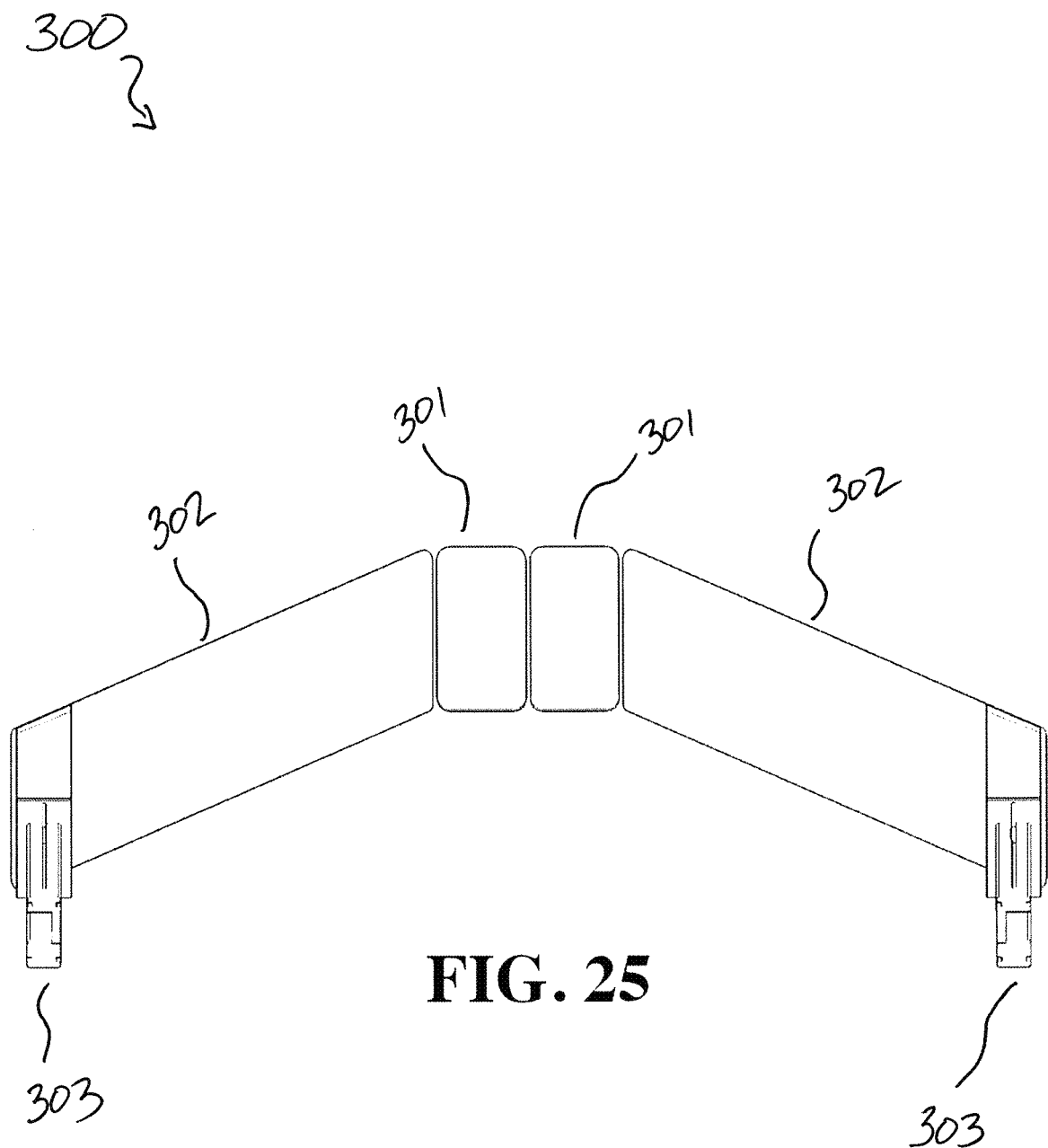
FIG. 25 is a front view of the stroller adapter of FIG. 23.
Figure 26:
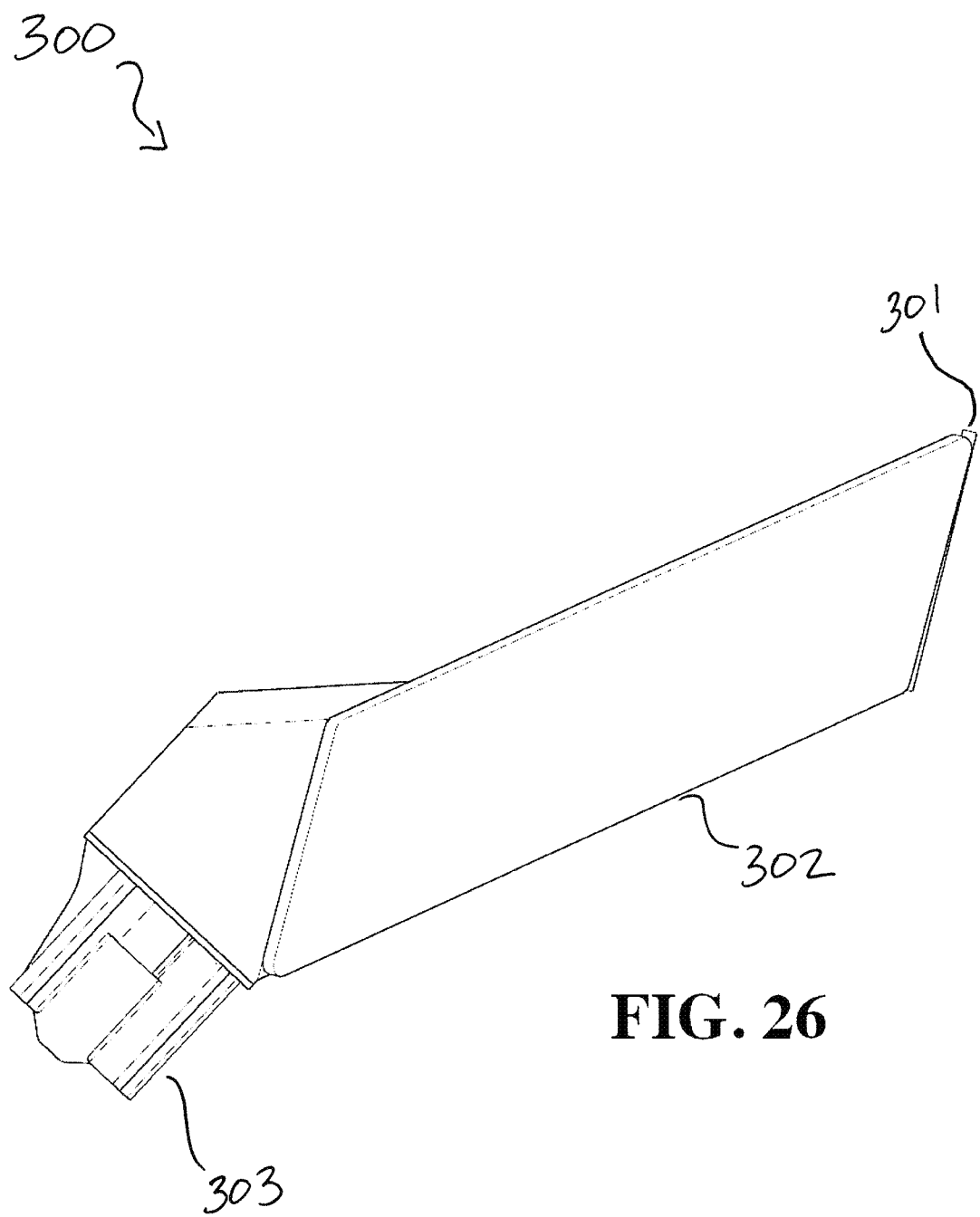
FIG. 26 is a right side view of the stroller adapter of FIG. 23.
Figure 27:
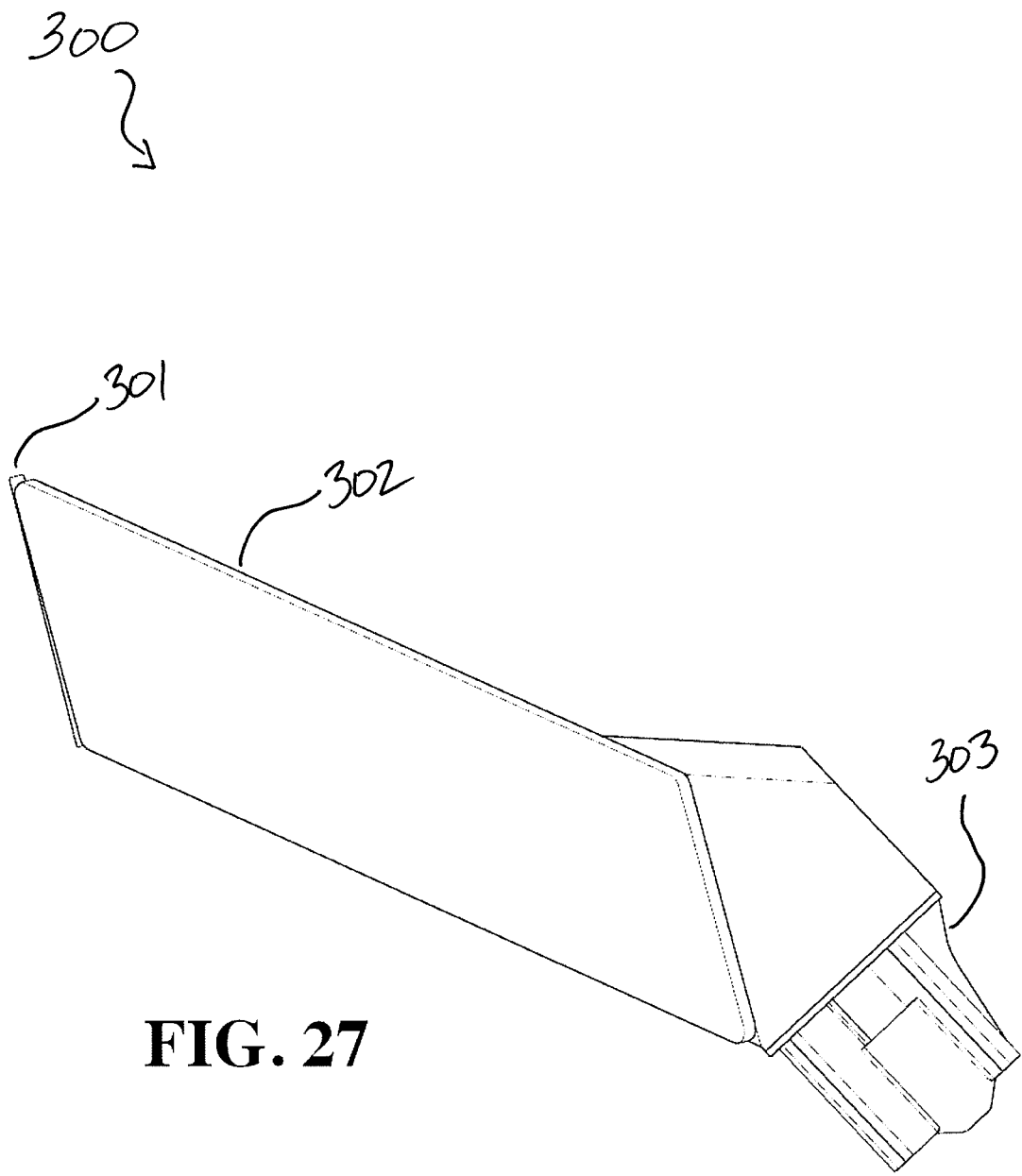
FIG. 27 is a left side view of the stroller adapter of FIG. 23.
Figure 28:
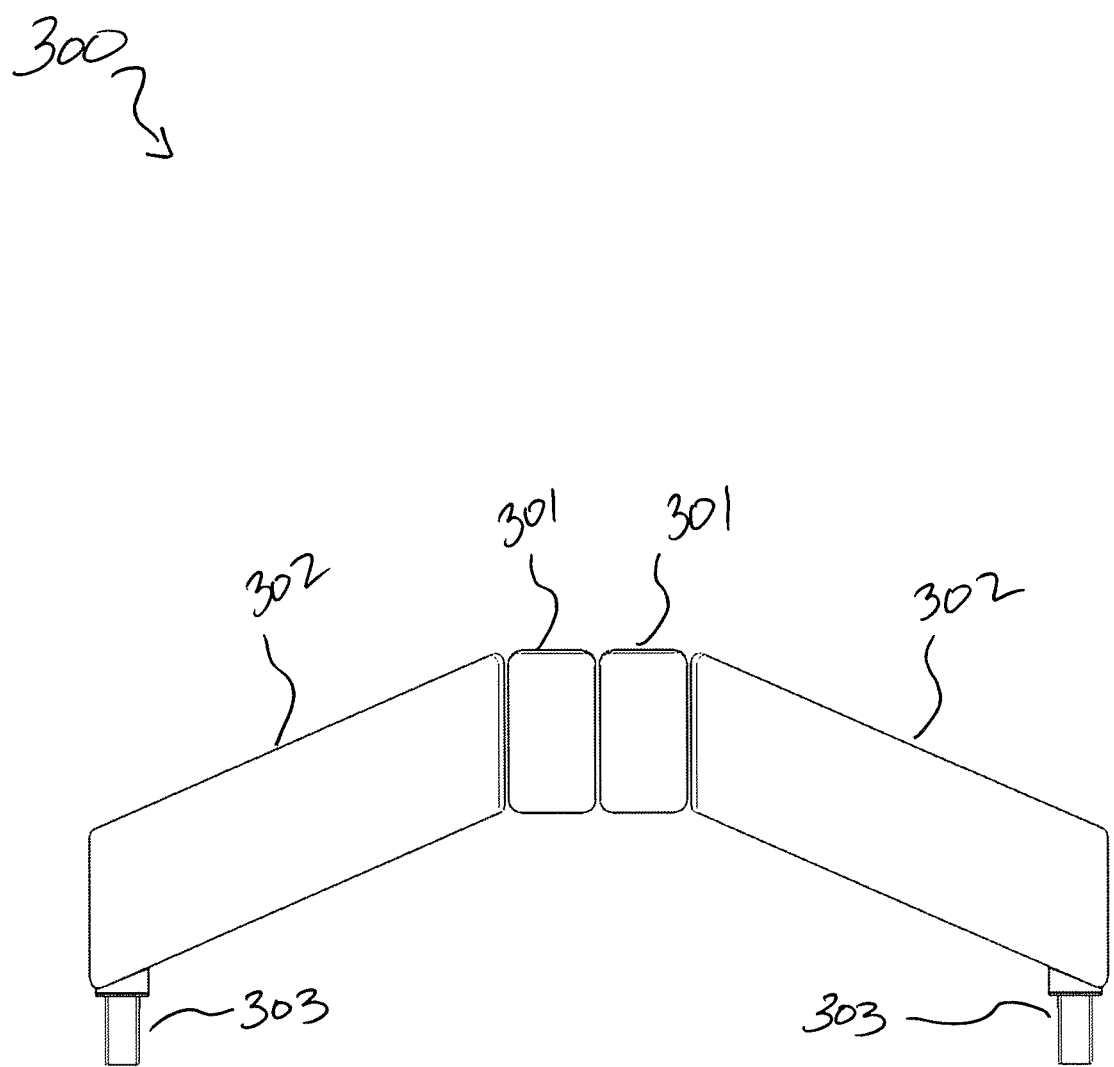
FIG. 28 is a rear view of the stroller adapter of FIG. 23.
Figure 29:
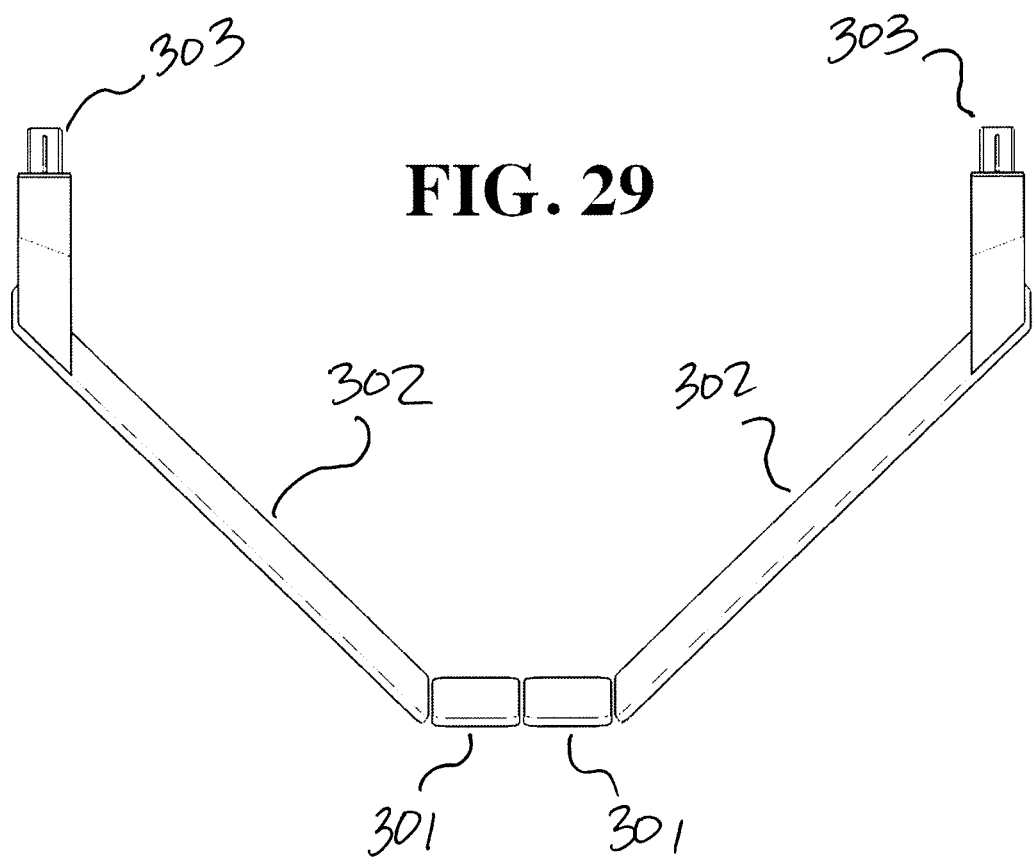
FIG. 29 is a top view of the stroller adapter of FIG. 23.
Figure 30:
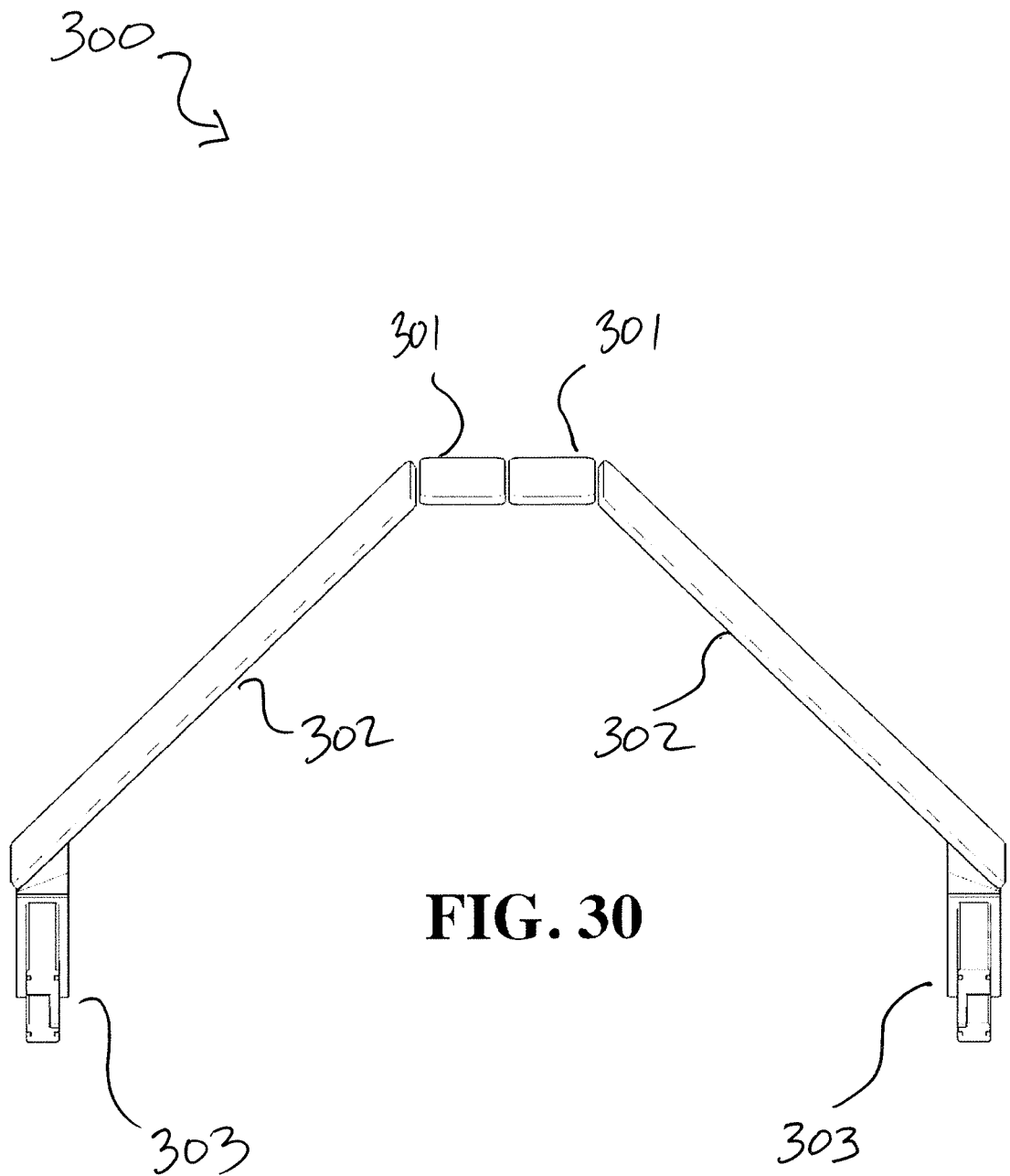
FIG. 30 is a bottom view of the stroller adapter of FIG. 23.
Figure 31:
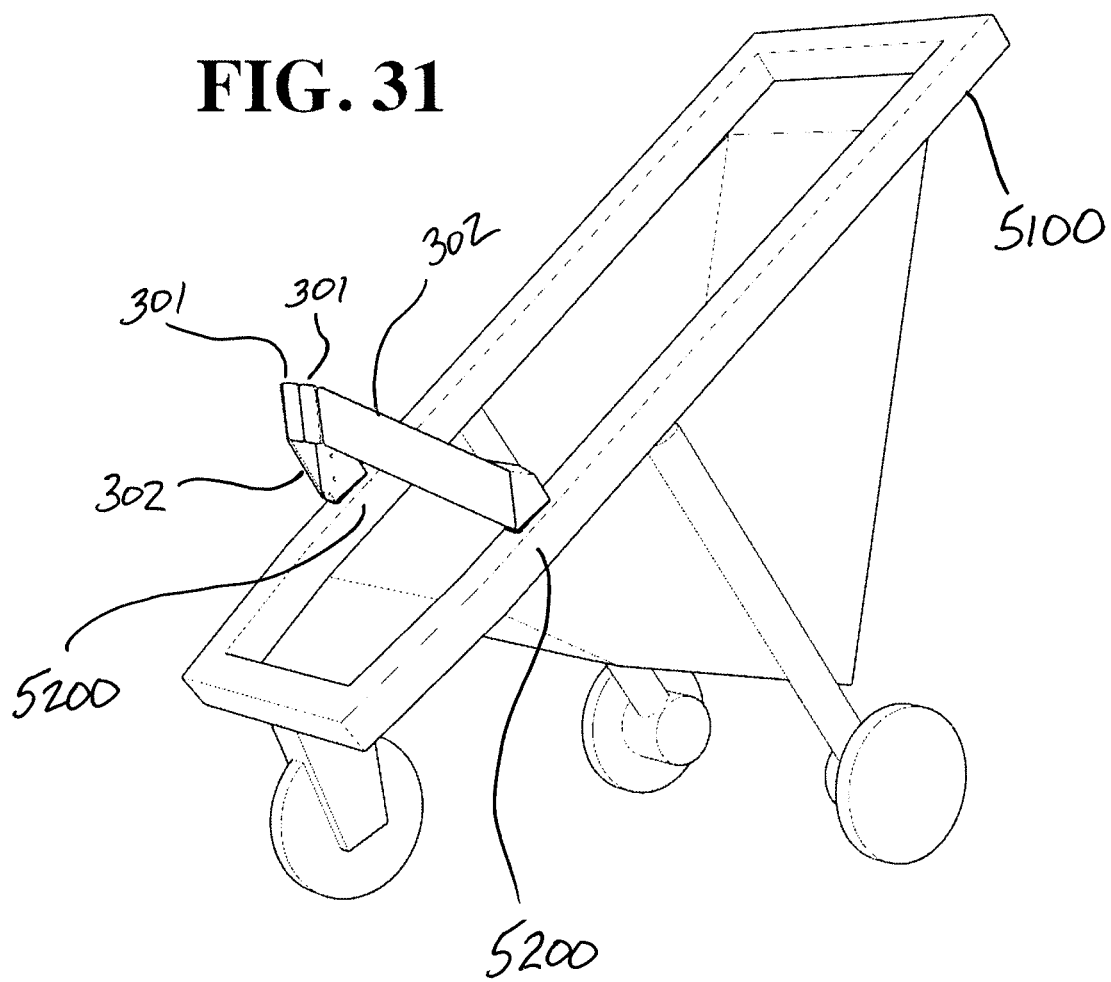
FIG. 31 is a perspective view of the stroller adapter of FIG. 23, as installed onto a baby stroller.

Referring now to FIG. 23, a perspective view of stroller adapter 300, according to aspects of the present disclosure is shown. FIGS. 24-32 illustrate various exterior views.

The stroller adapter 300 may include hinge pieces 301, struts 302, and mounting adapters 303. In some alternative embodiments, mounting adapters 303 could be a different shape or mechanism to adapt to a particular stroller. In some alternative embodiments, one or more components of stroller adapter 300 could be formed as a single piece or component.

Referring now to FIG. 32, a perspective view of the stroller adapter 300, as installed onto a baby stroller and carrying the child safety seat 100. The stroller adapter 300 allows for a parent to single-handedly lift child safety seat 100 from the stroller, without engaging or disengaging any locking mechanism

What is claimed is:

1. A child car seat mounting system for mounting a child car seat in an automobile seat having a seating surface and a back surface disposed at a desired seating angle thereto, comprising:
    a base unit having a bottom plate for being disposed on the seating surface of the automobile seat and a foot plate for being disposed against the back surface of the automobile seat, the base unit having:

first and second mounting brackets secured to the bottom and foot plates to secure the bottom and foot plates together at a predetermined angle conforming to at least the desired seating angle, the first and second mounting brackets each having a planar configuration perpendicular to each of the bottom and foot plates with an upper edge extending from the bottom plate to the foot plate at an obtuse angle relative to the bottom and foot plates and parallel to each other and separated by a separation distance, a mounting slot disposed in the upper edge of each of the first and second mounting brackets extending away from the respective upper edge, each of the mounting slots configured for receiving a mounting member, each of the mounting slots disposed at an acute angle relative to a respective upper edge and the bottom plate such that the mounting member can be inserted downward into the mounting slots in a direction towards the seating surface of the automobile seat, each of the mounting slots disposed a predetermined slot distance from the foot plate of base unit, first and second locking levers disposed each on a side surface of a respective one of the first and second mounting brackets and configured for operating in a locking configuration securing the mounting member in a locking configuration in the mounting slots and for operating in a release configuration for releasing the mounting member to allow the mounting member to be moved upwards from the mounting slots, a release device for configuring the first and second locking levers in the release configuration to release the locking lever when it is desired to move the mounting member upwards from the mounting slot, the bottom plate being flat, extending outwards from the mounting bracket, and having a uniform thickness throughout to provide a resting surface for the child car seat, and a securing slot in the mounting brackets, the securing slot configured for receiving a securing strap that is configured to overlay the mounting bracket from one side of the bottom plate to the other side thereof and be secured to the automobile seat via external fasteners on each end of the securing strap; and a mounting unit disposed on a bottom surface of the child car seat on an end thereof, the mounting unit having:
a bracket formed on the end of the child car seat, and the mounting member comprising a longitudinal member disposed in parallel to the bottom surface of the child car seat and, when the child car seat is in a secured position, it is secured to the first and second mounting brackets at a distance equal to the slot distance from a most distal portion of the end of the child car seat and configured to be inserted into the mounting slots when the child car seat is disposed on the bottom plate of the base unit wherein, when the child car seat is in the secured position, the most distal end thereof contacts the foot plate of the base unit.

2. The mounting system of claim 1, wherein the release device is disposed beneath the bottom plate of the base unit.

3. The mounting system of claim 2, wherein the first and second locking levers each comprise:
a spring-operated latch operating in a closed position and an open position that locks around the mounting member when the mounting member is inserted into a respective mounting slot.

4. The mounting system of claim 3, wherein the first and second locking levers each comprise:
a pivotal lever pivotally attached to a side surface of the respective first and second mounting bracket at a pivot point proximate the respective mounting slot and controlled to interact with a respective one of the latches to urge it from the closed position to the open position when pivoted; and
the pivotal lever having an extended portion that extends downward towards the bottom plate and through a slot to interface with the release device such that activation of the release device causes the pivotal lever to pivot and cause the respective latch to move to the open position.

5. The mounting system of claim 4, wherein the release device comprises a longitudinal member that extends from a position exterior to an end surface of the bottom plate distal to the back surface of the seating surface and is operable to reciprocate, wherein reciprocation away from the foot plate causes the pivotal levers to pivot which causes the respective latches to move to the open position.

6. The mounting system of claim 1, wherein the mounting member is cylindrical in shape and each of the mounting slots on the respective first and second mounting brackets has a bottom surface that conforms to the shape of the mounting member.

7. The mounting system of claim 1, wherein the bottom surface of the child car seat has an arcuate shape.

8. The mounting system of claim 7, wherein the bottom plate of the base unit extends outward to a resting surface from the first and second mounting brackets and from the foot plate of the base unit upon which the child car seat rests when secured to the first and second mounting brackets.

9. The mounting system of claim 8, wherein the resting surface is circular in shape.

10. The mounting system of claim 9, wherein the resting surface allows the child car seat to be disposed thereon in a side mounted position perpendicular to a secured orientation of the child car seat and then rotated to the secured position.

* * * * *